(12) United States Patent
Sano et al.

(10) Patent No.: US 6,327,110 B1
(45) Date of Patent: Dec. 4, 2001

(54) OPTICAL SYSTEM, POSITION DETECTING APPARATUS, MAGNETIC RECORDING APPARATUS, AND LENS WITH APERTURE

(75) Inventors: Kousei Sano, Neyagawa; Shin-ichi Kadowaki, Sanda, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/045,149

(22) Filed: Mar. 19, 1998

(30) Foreign Application Priority Data

| | | |
|---|---|---|
| Mar. 21, 1997 | (JP) | 9-067652 |
| Jul. 3, 1997 | (JP) | 9-178717 |
| Oct. 7, 1997 | (JP) | 9-274137 |

(51) Int. Cl.[7] ........................ G11B 7/00
(52) U.S. Cl. ............ 360/77.03; 369/112.01; 369/112.07
(58) Field of Search ................ 369/109, 103, 369/110, 112, 44.23, 44.24, 13; 360/77.03

(56) References Cited

U.S. PATENT DOCUMENTS

| | | | |
|---|---|---|---|
| 5,121,371 | * 6/1992 | Farnsworth et al. | 369/109 |
| 5,475,670 | * 12/1995 | Hamada et al. | 369/109 |
| 5,912,872 | * 6/1999 | Feldman et al. | 369/109 |

FOREIGN PATENT DOCUMENTS

| | | | |
|---|---|---|---|
| 5-2760 | * 1/1993 | (JP) | 369/109 |
| 6-84223 | * 3/1994 | (JP) | 369/109 |
| 9-161424 | 6/1997 | (JP) . | |

* cited by examiner

Primary Examiner—Nabil Hindi
(74) Attorney, Agent, or Firm—Ratner & Prestia

(57) ABSTRACT

For example, because an optical position detector for positioning a head for a high-density floppy disk is constituted so that openings 111 and 112 are used in which the thickness of a returning optical path bound for photodetectors 108R and 108L from a disk 107 is larger than the thickness of an advancing optical path bound for the disk 107 from a light source 101, a light beam is not easily interrupted in the middle of an optical path even if a light beam falls due to a tilt of the disk and therefore, it is possible to stably obtain position detection signals. Moreover, by reducing the luminous energy to be returned to a light source, it is possible to obtain a signal having less noises even if the distance between object images decreases and downsize an apparatus.

In the case of a conventional optical position detector for positioning a head for a high-density floppy disk, a light beam is tilted due to a tilt of a disk and interrupted in its returning path because the numerical aperture of an optical system is small and the quality of a signal used for position detection is easily deteriorated. Moreover, when decreasing the distance between object images in order to downsize an apparatus, noises of a light source increase and the quality of a signal is deteriorated.

12 Claims, 24 Drawing Sheets

Fig. 4
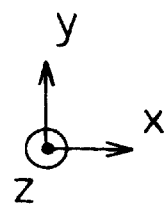
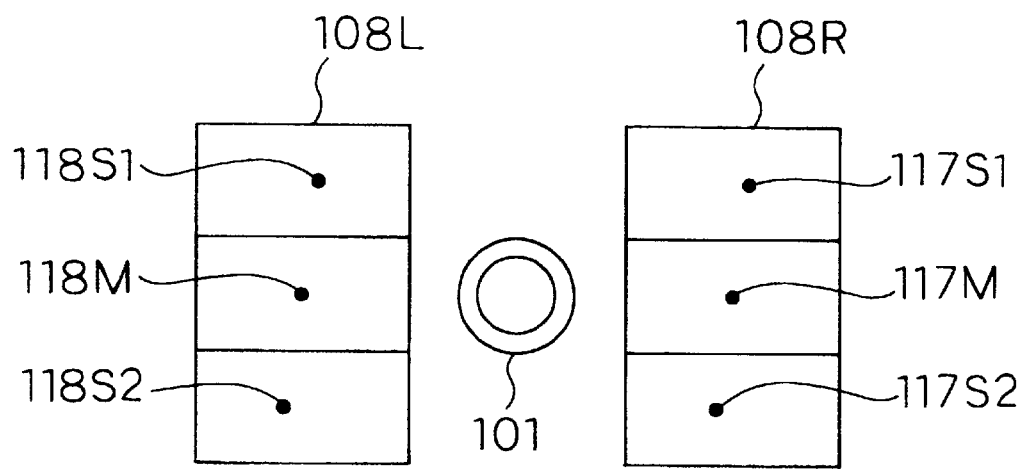

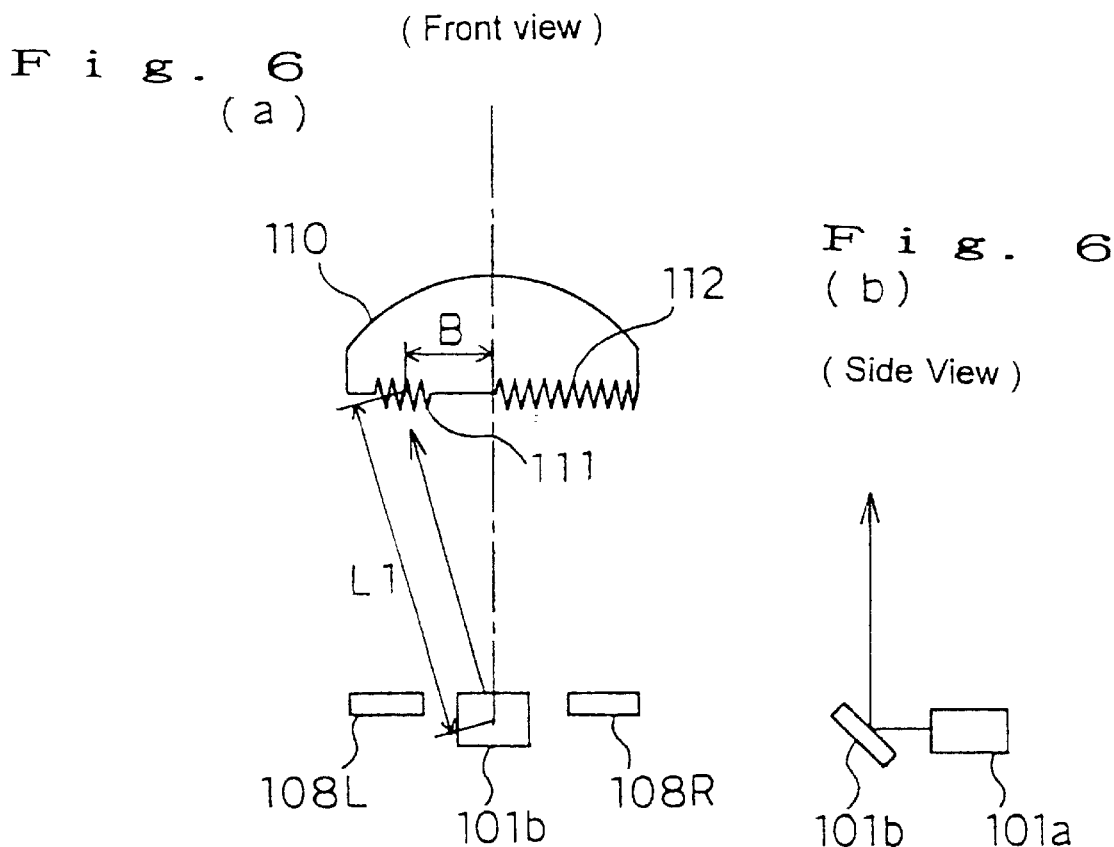
Fig. 6 (a) (Front view)
Fig. 6 (b) (Side View)
Fig. 6 (c) (Top view)
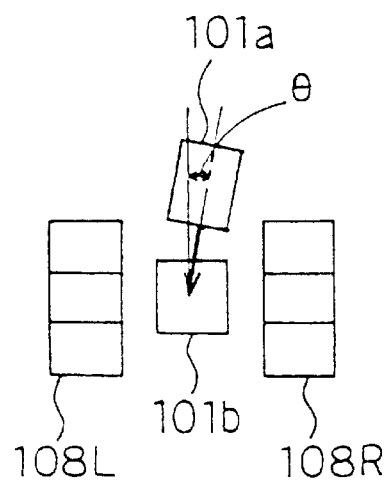

OPTICAL SYSTEM, POSITION DETECTING APPARATUS, MAGNETIC RECORDING APPARATUS, AND LENS WITH APERTURE

BACKGROUND OF THE INVENTION

1. Field of the Invention

The present invention relates to an optical system and a position detector for positioning a head by using light when recording and/or reproducing information in and/or from an information storage medium such as a high-density floppy disk or optical disk, and a magnetic recorder using the optical system and position detector or an aperture-provided lens for realizing the optical system, position detector, and magnetic recorder.

2. Related Art of the Invention

As recording information in a magnetic disk such as a floppy disk at higher density, the interval between tracks each of which is a string of pieces of information decreases. Therefore, because positioning of a magnetic head in the direction perpendicular, to tracks is difficult at a mechanical accuracy, an art for performing positioning by light has been developed.

For example, when the interval between guide grooves constituted with a pit string for tracking a high-density floppy disk is approx. 20 $\mu$m, it is possible to obtain a track error signal by using an optical system having a light-source wavelength of 780 nm and a numerical aperture of NA=approx. 0.04 at the disk side.

A conventional position detector in the track direction of a high-density floppy disk is described below by referring to FIG. 23.

As shown in FIG. 23, a light beam emitted from a semiconductor laser 101 serving as a light source produces a zero-order light ray and positive and negative first-order diffracted-light rays by a diffraction device 102 though not illustrated. In this case, the zero-order light ray is referred to as a main beam and the positive and negative first-order diffracted-light rays are referred to as sub-beams. The main beam and two sub-beams pass through a half mirror 103 and are condensed by a lens 104.

Openings of the main beam and sub-beams condensed by the lens 104 are restricted by an aperture 109 so that the openings have a predetermined numerical aperture NA and the main beam and sub-beams are condensed to a floppy disk of an information storage medium (-hereafter referred to as disk) 107.

Concentric information data strings are recorded in the disk 107 and they are referred to as tracks. Moreover, guide grooves are formed between tracks at proper intervals on the disk 107 so that positioning can be made by light rays. A beam string constituted with the main beam and two sub-beams is arranged so as to form a predetermined angle to the guide grooves on the disk 107.

Light rays reflected from the disk 107 pass through the aperture 109 and lens 104 again and they are reflected by the half mirror 103 to enter a photodetector 108.

The photodetector 108 is constituted with a plurality of detection regions, which receives three beams of the main beam and two sub-beams separately from each other and outputs a signal corresponding to the received luminous energy. These three beams irradiate respectively relatively different positions in the direction perpendicular to the guide grooves on the disk 107 on the basis of the guide grooves. Therefore, modulation factors of signals obtained from three detection regions are different from each other. By inputting these signals to an arithmetic circuit 300 and computing them, it is possible to detect the relative positional relations between guide grooves and beam irradiating positions. By using the relations, a magnetic head 201 is positioned to a track on the disk 107 to record and reproduce information into and from a desired track. Description of the arithmetic method by the arithmetic circuit 300 is omitted because the method is described in the official gazette of Japanese Patent Application Laid-open No. 9-161424 in detail.

Moreover, though not illustrated, there is another conventional position detector without a half mirror, having a structure in which condenser lenses are set to the optical path of the light emitted from a semiconductor laser and the optical path of the light reflected on a disk one each in order to separate the both optical paths from each other and light is diagonally applied to the disk 107.

However, this conventional type of the position detector has a problem that, when a disk tilts from a light beam, some of a light beam reflected on the surface of a disk is interrupted on a returning path and thereby, a position detection signal cannot be stably detected.

SUMMARY OF THE INVENTION

It is an object of the present invention to provide a position detector capable of stably detecting a position compared to a conventional one and a magnetic recorder, and an optical system and an aperture-provided lens to be applied to the detector and the recorder.

To achieve the above object, the invention of claim 1 is an optical system through which an advancing optical path for a light beam to enter a reflector and a returning path of the light beam reflected and/or diffracted from the reflector pass, wherein when when assuming the thickness of an optical path through which the advancing optical path passes without being interrupted as a first thickness and the thickness of an optical path through which the returning optical path passes without being interrupted as a second thickness, the second thickness is larger than the first thickness.

Moreover, the invention of claim 6 is a position detector comprising:

a light source for emitting a light beam;

condensing means for converging the light beam emitted from the light source on a reflector;

beam branching means for branching the light beam reflected and/or diffracted by the reflector;

a photodetector for receiving the light beam branched by the beam branching means and outputting a signal corresponding to the luminous energy of the light beam; and an arithmetic circuit for receiving the signal output from the photodetector and outputting a position detection signal; wherein when assuming the thickness of an optical path through which an advancing path for a light beam emitted from the light source to be bound for the reflector can pass without being interrupted as a first thickness and the thickness of an optical path through which a returning path for the light beam to be bound for the photodetector through the beam branching means from the reflector can pass without being interrupted as a second thickness, an optical system having the second thickness larger than the first thickness is constituted.

Furthermore, the invention of claim 7 is a magnetic recorder comprising:

a light source for emitting a light beam;

condensing means for converging the light beam emitted from the light source on an information storage medium;

beam branching means for branching the light beam reflected and/or diffracted by the information storage medium;

a photodetector for receiving the light beam branched by the beam branching means and outputting a signal corresponding to the luminous energy of the light beam;

an arithmetic circuit for receiving the signal output from the photodetector and outputting a position detection signal;

a magnetic head for recording and/or reproducing information in and/or from the information storage medium; and transfer means for positioning the magnetic head by receiving the position detection signal; wherein when assuming the thickness of an optical path through which an advancing optical path for the light beam emitted from the light source to be bound for the information storage medium can pass without being interrupted as a first thickness and the thickness of an optical path through which a returning path for the light beam to be bound for the photodetector through the beam branching means from the information storage medium can pass without being interrupted as a second thickness, an optical system having the second thickness larger than the first thickness is constituted.

Furthermore, the invention of claim 9 is an aperture-provided lens comprising an aperture having a first opening and a second opening correspondingly to the body of a lens, wherein at least one of the both openings is provided with a diffraction device.

Furthermore, the invention of claim 21 is an optical system constituted with an aperture whose opening diameter depends on a polarizing direction and polarizing-direction rotating means; wherein the opening of a light beam bound for a reflector is restricted by the aperture, the polarizing direction of the light beam whose opening is restricted is rotated by the polarizing-direction rotating means, and the opening of the light beam reflected by the reflector is not restricted when the light beam passes through the aperture again.

Furthermore, the invention of claim 22 is a position detector comprising:

a light source for emitting a light beam;

condensing means for converging the light beam emitted from the light source on a reflector;

beam branching means for branching the light beam reflected and/or diffracted by the reflector;

a photodetector for receiving the light beam branched by the beam branching means and outputting a signal corresponding to the luminous energy of the light beam; and an arithmetic circuit for receiving the signal output from the photodetector and outputting a position detection signal; wherein the condensing means is provided with an aperture having a first opening and a second opening correspondingly to the body of a lens and at least one of the both openings is provided with a diffraction device.

The invention of claim 23 is a magnetic recorder comprising:

a light source for emitting a light beam;

condensing means for converging the light beam emitted from the light source on an information storage medium;

beam branching means for branching the light beam reflected and/or diffracted by the information storage means;

a photodetector for receiving the light beam branched by the beam branching means and outputting a signal corresponding to the luminous energy of the light beam;

an arithmetic circuit for receiving the signal output from the photodetector and outputting a position detection signal;

a magnetic head for recording and/or reproducing information into and/or from the information storage medium; and transfer means for positioning the magnetic head by receiving the position detection signal; wherein the condensing means is provided with an aperture having a first opening and a second opening correspondingly to the body of a lens and at least one of the both openings is provided with a diffraction device.

As described above, the present invention makes it possible to realize a position detector capable of stably detecting a position compared to the case of a conventional structure, a magnetic recorder using the position detector, and an optical system and an aperture-provided lens to be applied to the detector and recorder.

Moreover, the present invention makes it possible to realize an optical system, position detector, and magnetic recorder which can be downsized compared to conventional structures.

BRIEF DESCRIPTION OF THE DRAWINGS

FIG. 4 is a schematic view showing the arrangement of beams on the photodetector of the embodiment 1 of the present invention;

FIGS. 6(*a*) to 6(*c*) are schematic views showing the positional relations between the light source, mirror, and first opening of the embodiment 1 of the present invention;

Figure 1:
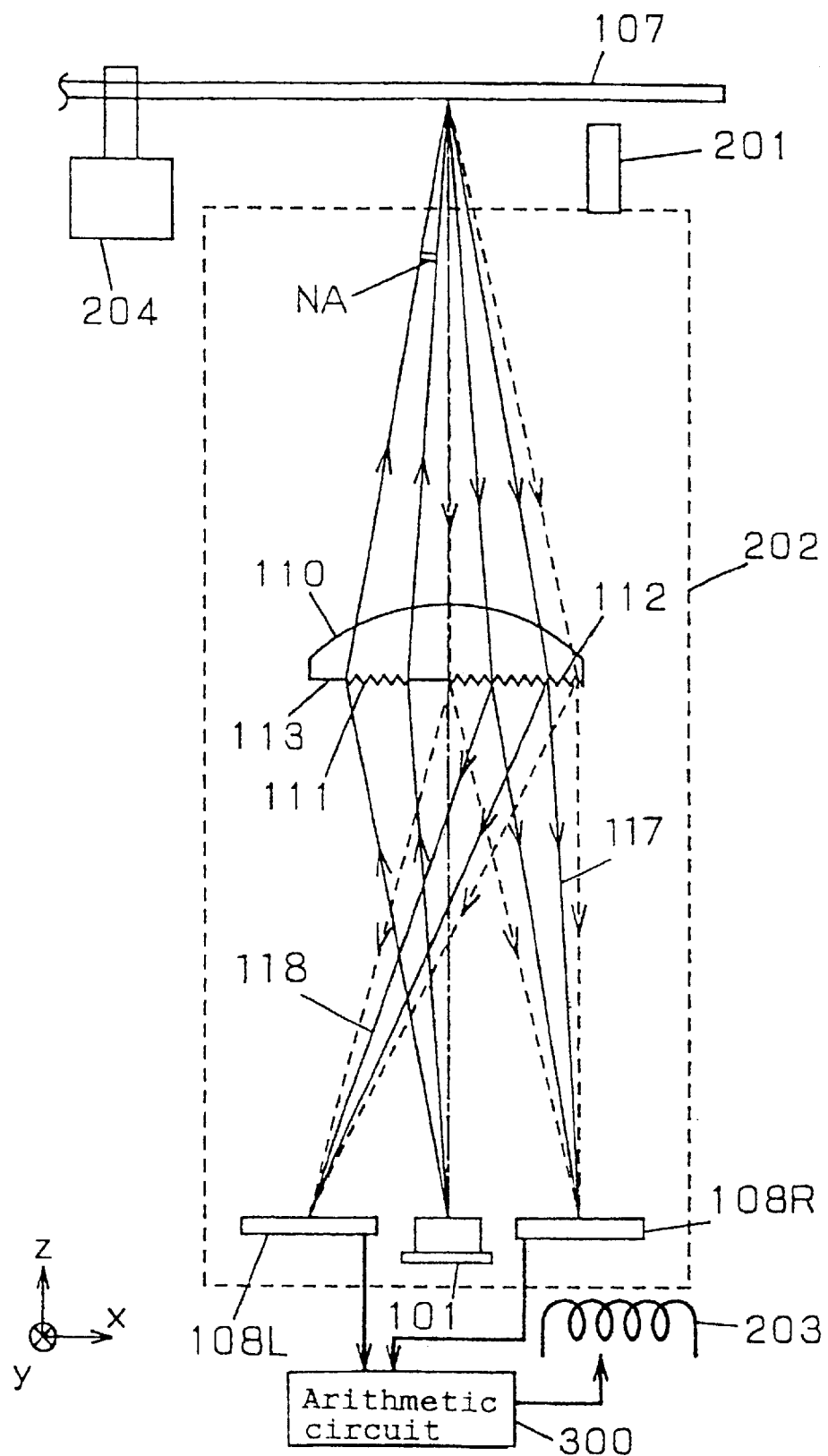
FIG. 1 is a schematic view of the magnetic recorder of embodiment 1 of the present invention.

REFERENCE NUMERALS 101, 101a Semiconductor laser
101b Mirror
102 Diffraction grating
103 Half mirror
104 Lens
105 Polarization anisotropic aperture
106 Quarter-wavelength plate
107 Disk
108L, 108R Photodetector
109 Aperture
110 Aperture-provided lens
111 First opening
112 Second opening
113 Opaque film
114M, 114S1, 114S2 Position of advancing light beam
115 Guide groove
116M, 116S1, 116S2 Position of light beam on the disk
117M, 117S1, 117S2 Position of positive first-order diffracted beam
118M, 118S1, 118S2 Position of negative first-order diffracted beam
120 Aperture
130 Aperture-provided lens
131 Second opening
132 Boundary
133 Aperture-provided lens
134 Second opening
135M, 135S1, 135S2 Position of returning light beams
136 Aperture-provided lens
137 Second opening
138 Aperture-provided lens
139 Diffraction device of the opaque portion
140 First opening
141M, 141S1, 141S2 Position of light beam on the disk
142 Aperture-provided lens
143, 144 Diffraction device of the opaque portion
145, 146 Second opening
147 Aperture-provided lens
148 Concaves and convexes
149 Second opening
150 Boundary
160 Substrate
161 Diffraction device
162 Diffraction device for three beams
163 Opaque portion
170 Aperture-provided lens
171 First opening
172 Opaque portion
173 Second opening
174 Photodetectors
175 Photodetectors
176 Disk
177–180 Detection region
181–183 Differential circuit
201 Magnetic head
Position detector
203, 204 Motor
300 Arithmetic circuit

DESCRIPTION OF THE PREFERRED EMBODIMENTS

Embodiments of the present invention are described below by referring to FIGS. 1 to 22. The same symbol in the following drawings denotes the same function and the indications of coordinate axes shown in the drawings denote the relativity between directions of drawings.

[Embodiment 1]

FIG. 1 is a schematic view of the magnetic recorder of an embodiment of the present invention. This embodiment is described below by referring to FIGS. 1 to 7.

First, the structure and operations of the magnetic recorder are described.

Figure 3:
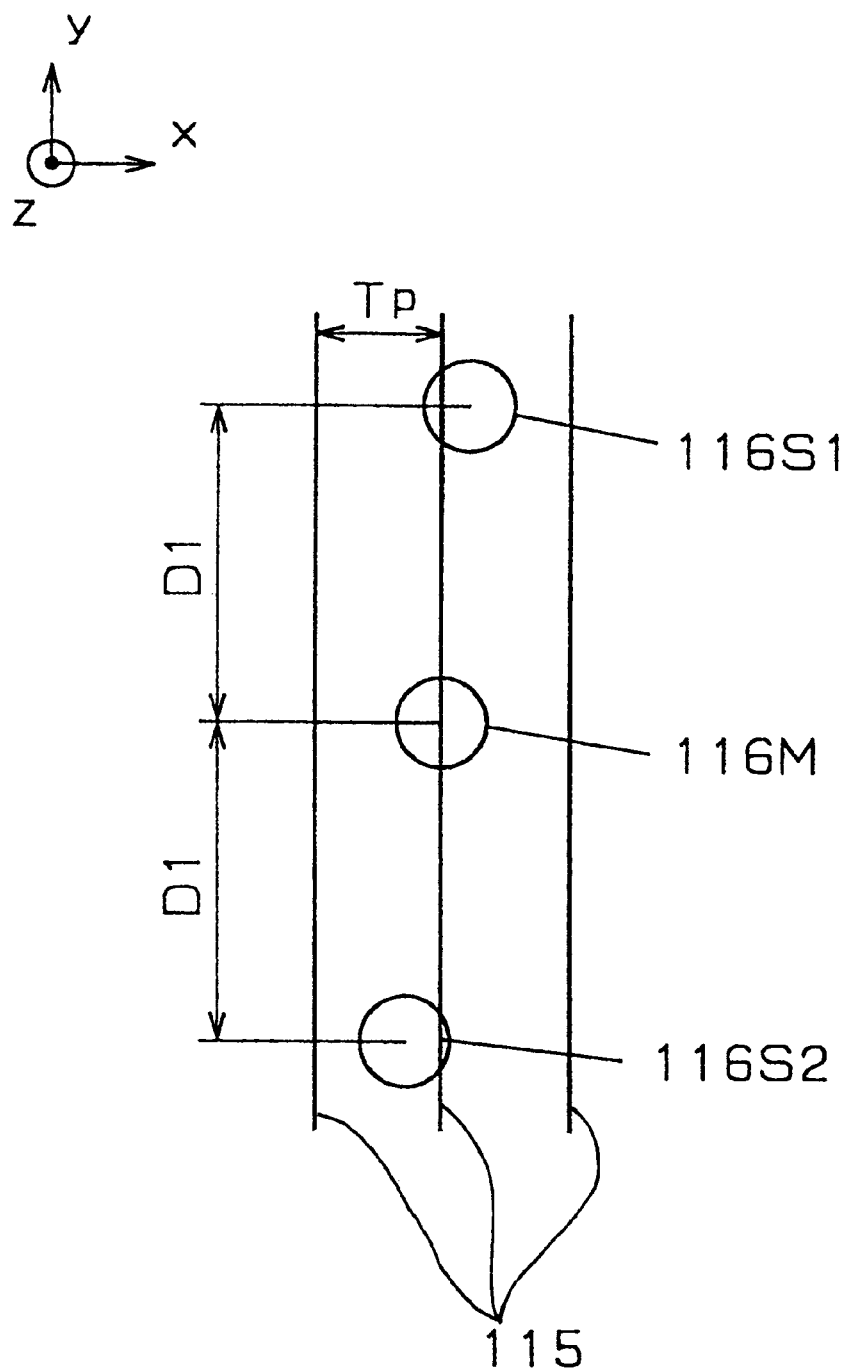
FIG. 3 is a schematic view showing the arrangement of beams on the disk of the embodiment 1 of the present invention.

That is, a discoid disk 107 is rotated by a motor 204. A magnetic head 201 for recording, reproducing, and erasing information and a position detector 202 are moved together in the radius direction of the disk 107 by a motor 203. The magnetic head 201 is positioned in the direction perpendicular to tracks in accordance with the irradiation position of the position detector to a guide groove 115 by receiving a position detection signal output from an arithmetic circuit 300 as shown in FIG. 3.

Then, the path of a light beam of this embodiment is described.

Figure 2:
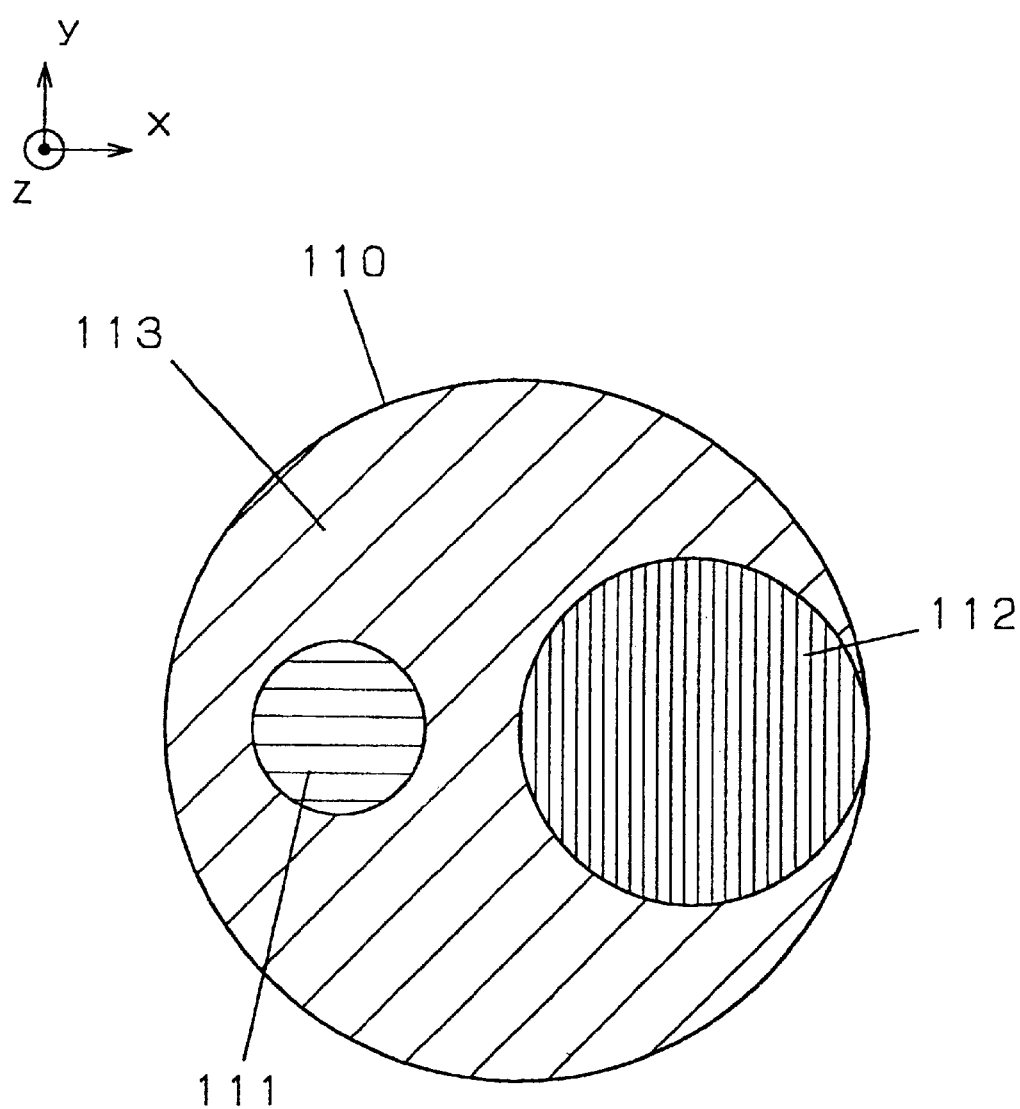
FIG. 2 is a front view of the aperture-provided lens of the embodiment 1 of the present invention.

The light beam emitted from a semiconductor laser 101 serving as a light source enters an aperture-provided lens 110. FIG. 2 shows a front view of the aperture-provided lens 110 viewed from the optical axis direction. A diffraction device constituted with a simple grating is formed on a first opening 111. Moreover, another diffraction device is formed on a second opening 112. Regions other than the first opening 111 and the second opening 112 are interrupted by an opaque film 113.

Though not illustrated, a zero-order light ray and positive and negative first-order diffracted-light rays are produced by the diffraction device of the first opening 111 of the aperture-provided lens 110. In this case, the zero-order light ray is referred to as a main beam and the positive and negative first-order diffracted-light rays are referred to as sub-beams.

The main beam and two sub-beams passing through the first opening 111 are condensed by the aperture-provided lens 110. The condensed main beam and two sub-beams are condensed by the disk 107 as information storage media. In this case, an opening restriction device of the present invention corresponds to the opaque film 113.

FIG. 3 shows the arrangement of beams on the disk 107.

As shown in FIG. 3, a beam string constituted with a main beam 116M and two sub-beams 116S1 and 116S2 is set so as to have a predetermined angle from a guide groove 115 of the disk 107. The interval between each of the sub-beams and the main beam in the direction perpendicular to guide grooves (x direction) of each sub-beam and the main beam is set to a value ¼ of a guide-groove interval Tp. Moreover, each interval between directions parallel to the guide groove between light beams is set to D1.

The light reflected from the disk 107 enters the second opening 112 of the aperture-provided lens 110 and it is diffracted by the diffraction device of the second opening 112 and enters photodetectors 108R and 108L. Each of the photodetectors 108R and 108L is constituted with a plurality of detection regions, which separately receives three light rays of the main beam and two sub-beams and outputs a signal corresponding to the luminous energy of each beam. The arithmetic circuit 300 receives a signal output from each of the photodetectors 108R and 108L and generates a position detection signal.

FIG. 4 shows the positional relations between detection regions of the photodetectors 108R and 108L and beams to be detected.

As shown in FIG. 4, a positive first-order diffracted beam diffracted by the diffraction device of the second opening 112 becomes 117M, 117S1, and 117S2 and a negative first-order diffracted beam becomes 118M, 118S1, and 118S2. Each group of these three beams irradiates relatively different positions in the direction perpendicular to the guide grooves 115 on the disk 107 on the basis of one of the grooves. Therefore, modulation factors of signals obtained from three detection regions are different from each other and by computing these signals, it is possible to detect the relative positional relation between a guide groove and a beam irradiating position. Detailed description of an operation method for detecting a position signal is omitted because it is described in the official gazette of Japanese Patent Application Laid-Open No. 9-161424.

In the case of the above structure, because the second opening 112 is larger than the first opening 111, the thickness of the returning optical path (optical path shown by a broken line passing through the second opening 112 in FIG. 1) is larger than the thickness of the advancing optical path (optical path shown by a continuous line passing through the first opening 111 in FIG. 1).

Then, a numerical aperture is described below.

Figure 23:
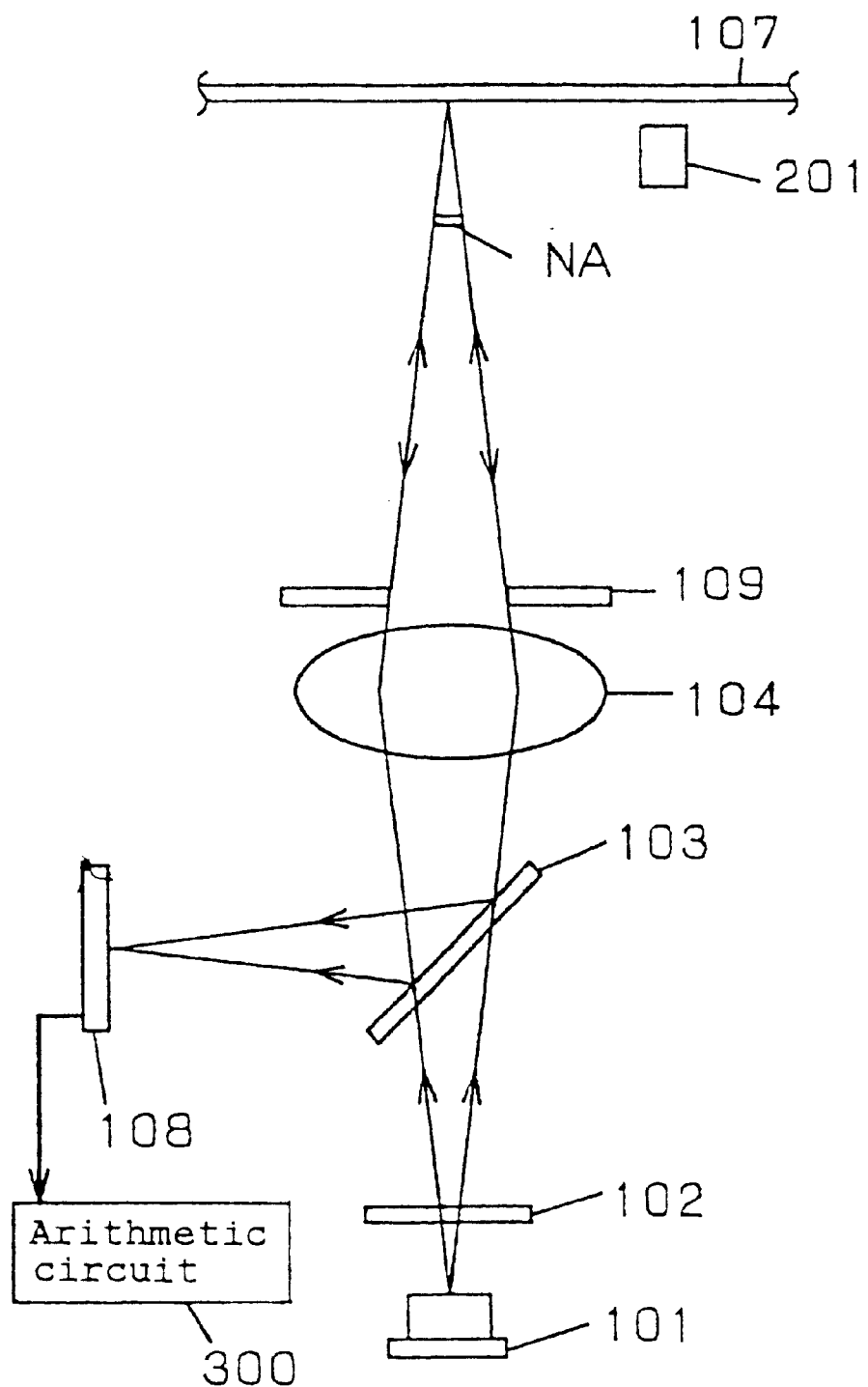
FIG. 23 is a schematic view of the optical system of a conventional position detector.

In the case of the conventional example shown in FIG. 23, if the tilt of the disk is 1.10 when NA is 0.04, almost half of the light beam reflected by the disk is interrupted by the aperture 109. Therefore, the quality of a signal used for position detection is deteriorated.

However, this embodiment uses a structure in which the thickness of the returning optical path is larger than that of the advancing optical path. Therefore, even if the disk tilts when the numerical aperture NA1 of the first opening is set to 0.04 and the numerical aperture NA2 of the second opening is set to 0.08, returned light beam is not interrupted up to 1.1° or the quality of the signal is not deteriorated. When the tilt reaches 2.2°, deterioration of a signal almost equal to 1.1° of the conventional example occurs.

Therefore, when using this embodiment, the light reflected by a disk due to a tilt of the disk is not easily interrupted even if the light returns to a position different from a desired position or the quality of a position detection signal is not easily deteriorated. Thus, it is possible to decrease the number of adjustment steps including the step of adjusting the tilt of a position detector from a disk.

Moreover, in the case of the method of using a main beam and two sub-beams shown in this embodiment, the sub-beams diagonally enter differently from the main beam even if the disk does not tilt. Therefore, it is possible to solve the problem that some of the light beam reflected by the disk of the conventional example is interrupted by an aperture.

Figure 24:
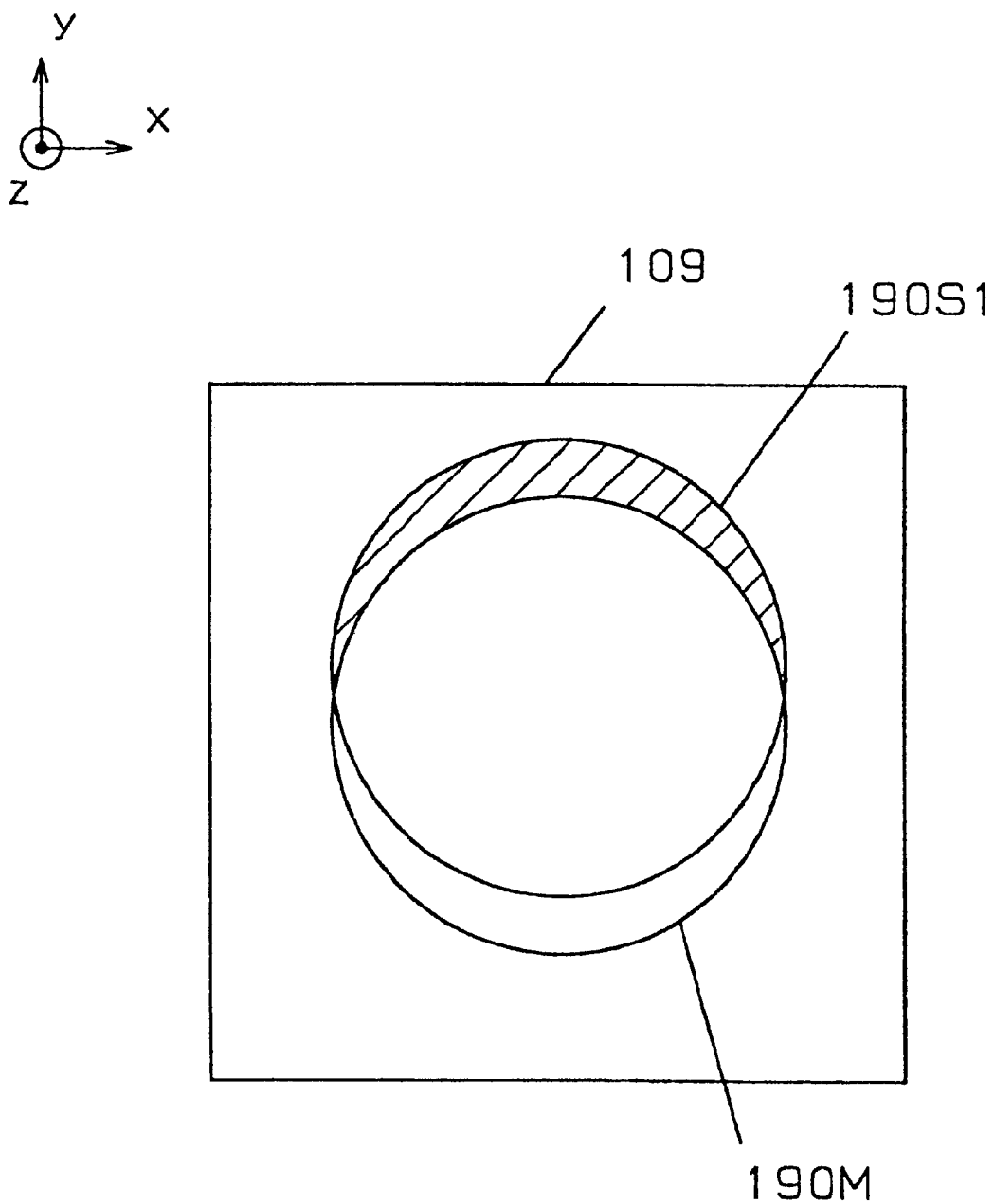
FIG. 24 is a schematic view showing the positional relation between main beam and sub-beam on a conventional aperture.

That is, FIG. 24 shows the relation between the position of an opening on the aperture 109 and the main beam 190M and one sub-beam 190S1 of two sub-beams reflected by the disk of a conventional example. The opening of the aperture 109 coincides with the main beam 190M unless the disk tilts. However, because the sub-beam 190S1 is generally deviated from the opening of the aperture 109, some of a light beam (hatched portion) is interrupted by the aperture 109. Though not illustrated, the other sub-beam 190S2 is deviated to the side opposite to the sub-beam 190S1 and some of the sub-beam 190S2 is interrupted similarly to the case of 190S1.

Particularly, when the distance between a lens and a disk is decreased because of the request for downsizing an apparatus, a positional shift of a sub-beam reflected by a disk on an aperture increases to the beam diameter and a percentage in which a light beam is interrupted increases in the case of the conventional structure shown in FIG. 24. Therefore, the deterioration degree of a position detection signal increases. Even in this case, however, by using the structure of this embodiment, a sub-beam reflected by a disk is not interrupted by an aperture and therefore, it is possible to obtain a stable position detection signal.

Moreover, by making the grating interval of the diffraction device of the first opening 111 smaller than that of the diffraction device of the second opening 112, it is possible to prevent a light beam passing through the second opening 112 and bound for a disk from the semiconductor laser 101 from reflecting on the disk 107 and entering the first opening 111. Thereby, it is possible to reduce the amount of stray light entering the photodetectors 108R and 108L.

Figure 5:
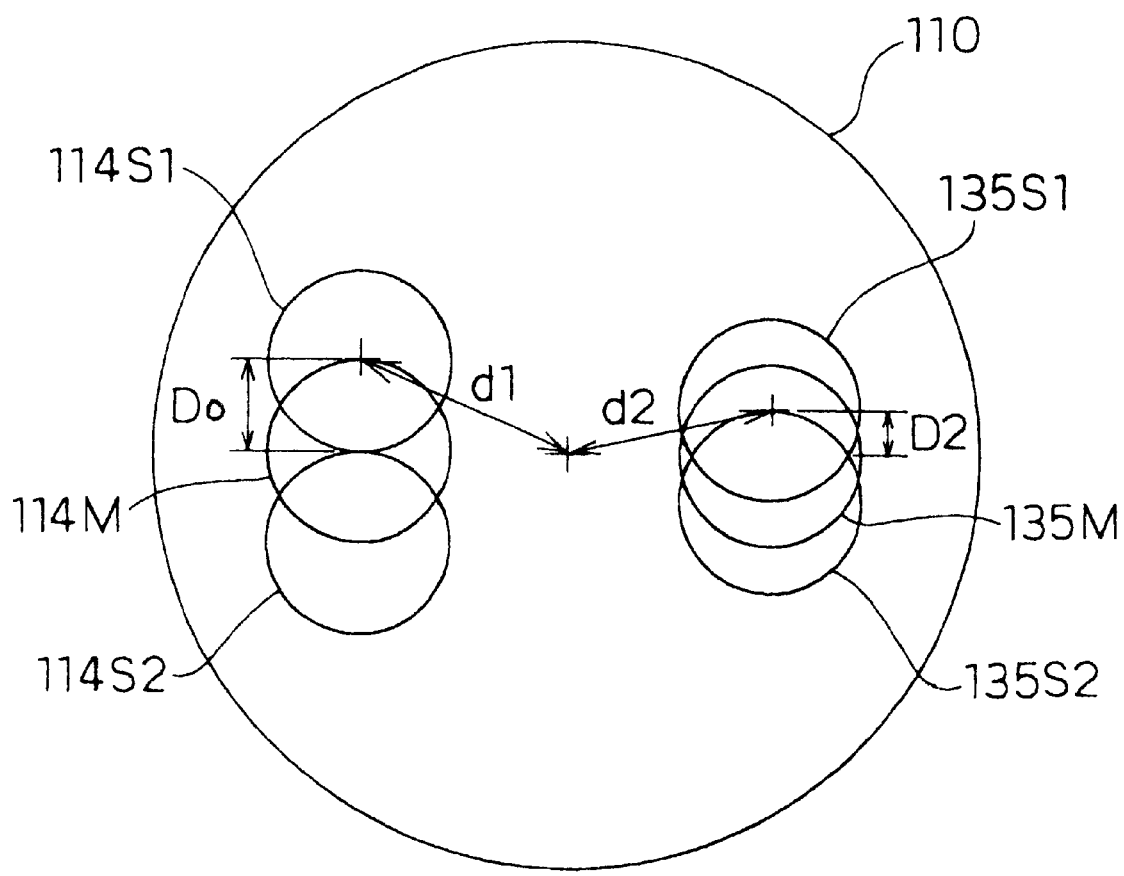
FIG. 5 is a schematic view showing the arrangement of beams on the surface of the aperture-provided lens of the embodiment 1 of the present invention.

FIG. 5 shows positions of beams on the aperture-provided lens 110. Symbols 114M, 114S1, 114S2 denote the advancing beams generated by the diffraction grating of the first opening 111 and bound for the disk 107. Symbols 135M, 135S1, and 135S2 denote the positions when these light beams are condensed by the disk 107 and thereafter, reflected to become returning beams and pass through the surface of the aperture-provided lens 110 again. When assuming the interval between advancing light beams as D0, the beam interval on the disk 107 as D1 as shown in FIG. 3, and D1 is smaller than D0 in accordance with the arrangement of optical systems and the interval between the diffraction gratings 111, the interval D2 between returning light beams becomes smaller than D1. Therefore, when assuming the distance between the center of the aperture-provided lens 110 and the center of the sub-beam 114S1 of the advancing light beam as d1 and the distance between the center of the aperture-provided lens 110 and that of the sub-beam 135S1 of the returning light beam as d2, d1 is larger than d2. Therefore, it is found that the returning light beam is closer to the center of the aperture-provided lend 110. Therefore, when the disk 107 tilts from the optical axis, light is not easily interrupted or a signal is not easily deteriorated because a returning light beam 135 has a margin.

Moreover, in the case of the optical system used here, the first opening 111 for generating an advancing light beam is shifted from the light source 101 when compared to the front of the aperture-provided lens 110 as shown in FIG. 1. In the case of this type of optical system, the availability of light is lowered when using a light source such as a semiconductor laser having a difference in intensity distribution. Therefore, as shown in FIGS. 6(a) to 6(c), a semiconductor laser 101a serving as a light source is set diagonally to a mirror 101b. Thus, the light beam emitted from the mirror 101b has the strongest luminous energy at its portion bound for the first opening 111. An angle θ for diagonally setting the semiconductor laser 101a is determined so that sin θ is equal to B/L1 when assuming the distance from the mirror to the center of the first opening 111 as L1 and the shift value from the front of the mirror to the first opening 111 as B. In this case, FIG. 6(a) is a front view showing the arrangement between the semiconductor laser 101a serving as a light source, mirror 101b, and first opening 111 and FIG. 6(b) is a side view showing the arrangement, and FIG. 6(c) is a top view showing the arrangement.

Thereby, it is possible to improve the availability of light even for the optical system of this embodiment and obtain a detection signal having a high signal-to-noise ratio (S/N ratio).

Moreover, this embodiment makes it possible to change numerical apertures for an advancing path and a returning path and constitute a compact tilt-adjustment-free position detector with a simple optical device without using a polarization-type anisotropic device.

Furthermore, the structure of this embodiment decreases a light loss because an advancing optical path bound for a disk from a light source is different from a returning optical path bound for a photodetector from the disk and thereby, a half mirror is unnecessary though the conventional example requires a half mirror.

That is, in the case of the conventional example, only up to 25% of light can be used for advancing and returning paths even if 50% of the light can be used for the advancing path and 50% of the light can be used for the returning path. In the case of this embodiment, however, there is not the above loss but 100% of light can be used. Therefore, it is possible to obtain a signal having an S/N ratio higher than a conventional signal.

Moreover, the present invention condenses the light rays of advancing and returning paths by forming openings in different regions of one lens. Therefore, a conjugate relation is effected between a light emitting point and a light condensing point of reflected light. Therefore, the present invention can be more easily adjusted and is stable for the change of environmental temperatures or the like than the prior art where two lenses are provided in the advancing and returning paths.

Figure 7:
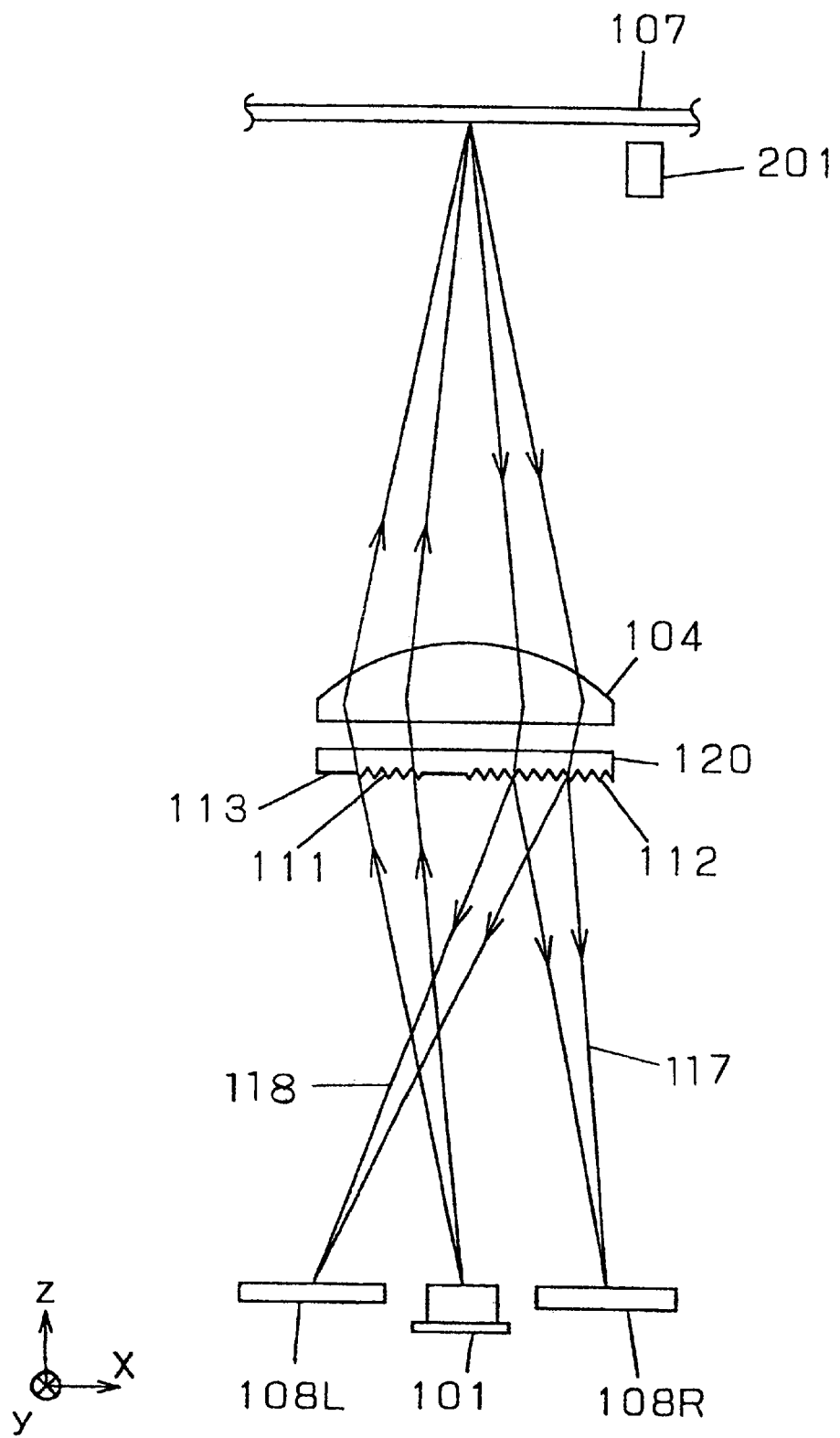
FIG. 7 is a schematic view showing another optical system of a position detector which can be applied to the magnetic recorder of the embodiment 1 of the present invention.

Furthermore, as shown in FIG. 7, the present invention allows a structure in which the lens 104 is separated from an aperture 120. The structure shown in FIG. 7 also makes it possible to obtain the same advantage as the structure in FIG. 1. Moreover, the structure in FIG. 7 can be easily manufactured because a normal lens can be used as the lens 104 and the aperture 120 can be obtained by only forming a diffraction device on a flat device though the number of devices increases.

Furthermore, it is possible to constitute a structure only with either side 108R or 108L of the light receiving sections of the photodetectors 108R and 108L by blazing the diffraction device of the second opening 112 and weakening either of the positive and negative first-order diffracted-light rays 117 or 118. In this case, the area of the light receiving plane of the photodetector 108R or 108L is halved and thereby, it is possible to decrease the number of parts.

Furthermore, when constituting the whole of a structure with transmission-type devices like this embodiment, it is possible to obtain a desired advantage without increasing the amount of stray light entering a photodetector.

Even when constituting a structure by using reflection-type devices, the advantage described for this embodiment can be obtained. The structure using reflection-type devices has an advantage that the length of an apparatus in the optical axis direction can be decreased while keeping the same optical path length.

[Embodiment 2]

The position detector of an embodiment of the present invention is described below by referring to FIGS. 8 and 9.

Figure 8:
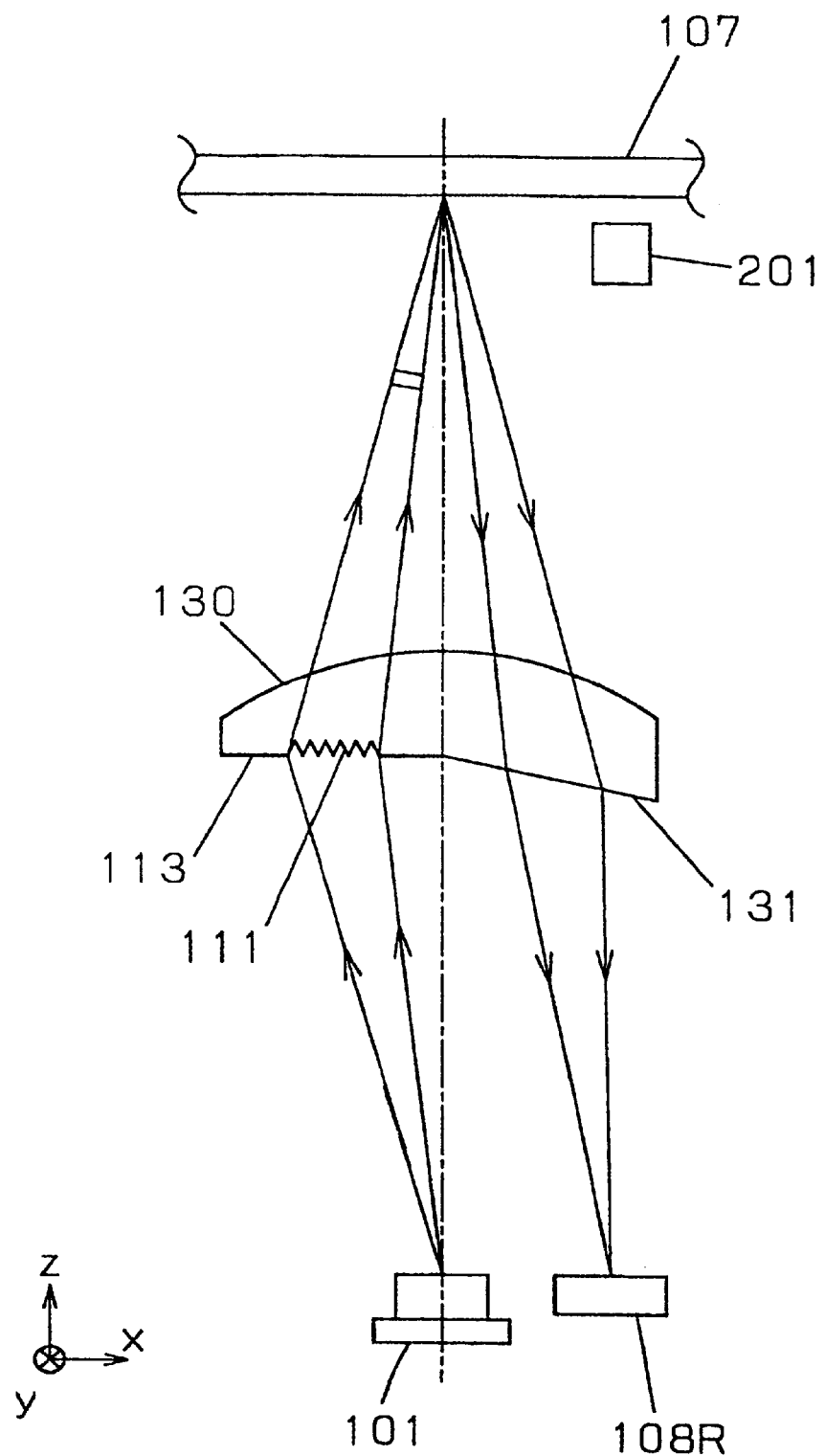
FIG. 8 is a schematic view of an optical system of the position detector of embodiment 2 of the present invention.

FIG. 8 is a schematic view of the optical system of the position detector of the embodiment 2 of the present invention.

The optical system of the embodiment 2 is mainly different from that of the embodiment 1 in that no diffraction device is provided for the second opening 131 of the aperture-provided lens 130.

Figure 9:
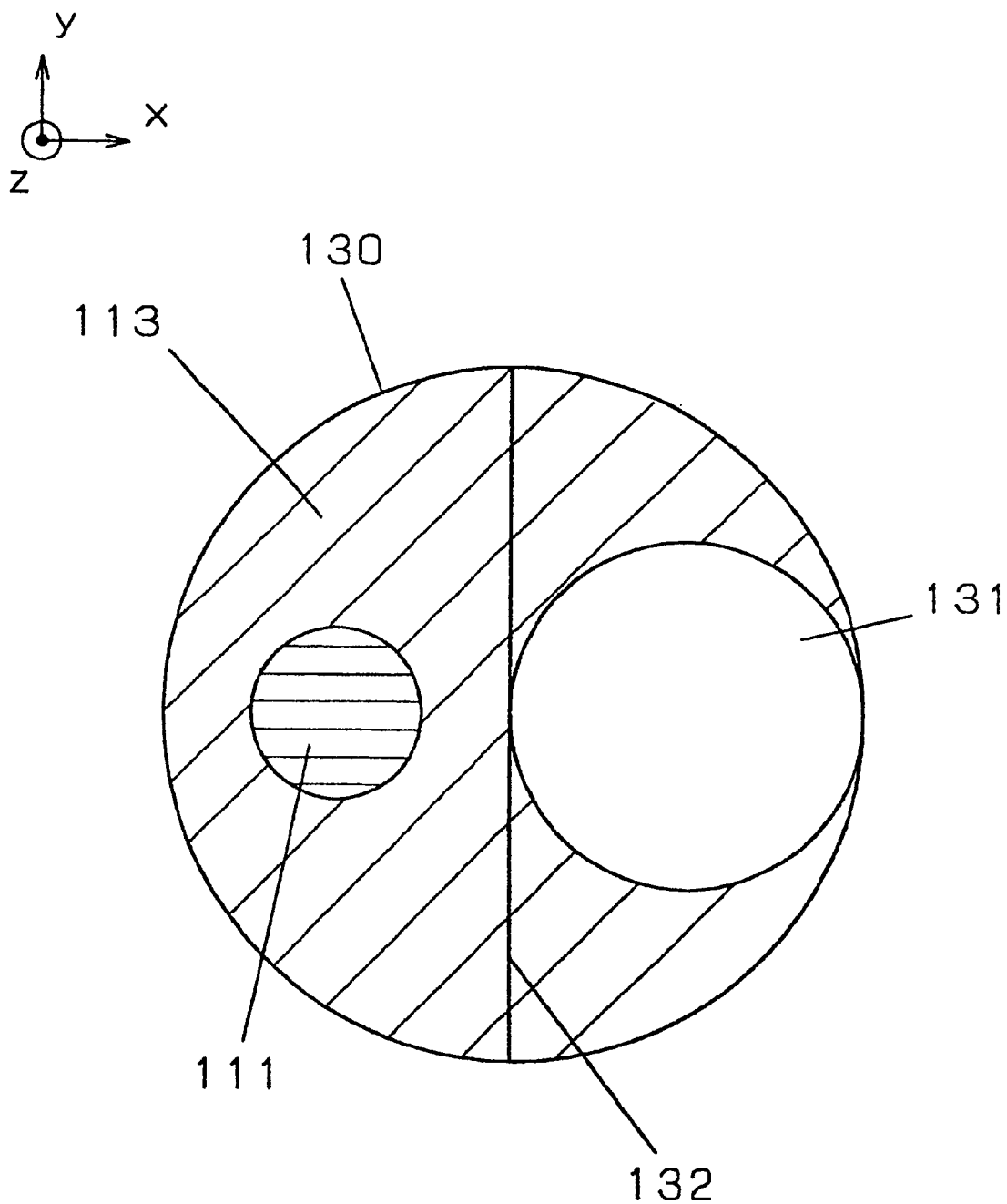
FIG. 9 is a front view of the aperture-provided lens of the embodiment 2 of the present invention.

FIG. 9 is a front view of the aperture-provided lens 130 viewed from the optical axis direction.

The bottom of the aperture-provided lens 130 is folded at a boundary 132 and a part of the bottom is formed into a prism. The normals at the bottom of the lens at the right and left of the boundary 132 are not parallel with each other. Thereby, the light passing through the second opening 131 is condensed at a point difference from the semiconductor laser 101 serving as a light source. By setting the photodetector 108R to the condensed point, it is possible to detect a signal.

The embodiment 2 makes it possible to obtain the same advantage as the embodiment 1 and moreover, obtain a position detection signal at a high S/N ratio even when luminous energy is small because it is possible to efficiently use the light beam passing through the second opening 112 compared to the case of the first embodiment.

Moreover, because it is possible to theoretically decrease the light to be returned to the semiconductor laser 101 serving as a light source by passing through the second opening to zero differently from the case of using a diffraction device for the second opening, noises due to returned light do not occur in the semiconductor laser. Therefore, even in case of a structure having a small distance between a semiconductor laser and a disk, the semiconductor laser stably operates. That is, the structure of this embodiment is particularly advantageous to downsize an optical system.

Furthermore, this embodiment is constituted so that bottom of the aperture-provided lens 130 is made flat and the normals of the bottom at the right and left of the boundary 132 are not parallel with each other. However, the present invention is not restricted to this embodiment. For example, it is also possible to provide two flat surfaces with normals not parallel with each other for the upper side of a lens or realize a function for condensing light on different points by setting spherical surfaces whose centers are different from each other at the both sides of their boundary.

[Embodiment 3]

Then, the aperture-provided lens of an embodiment of the present invention is described below by referring to FIGS. 10 and 11.

Figure 10:
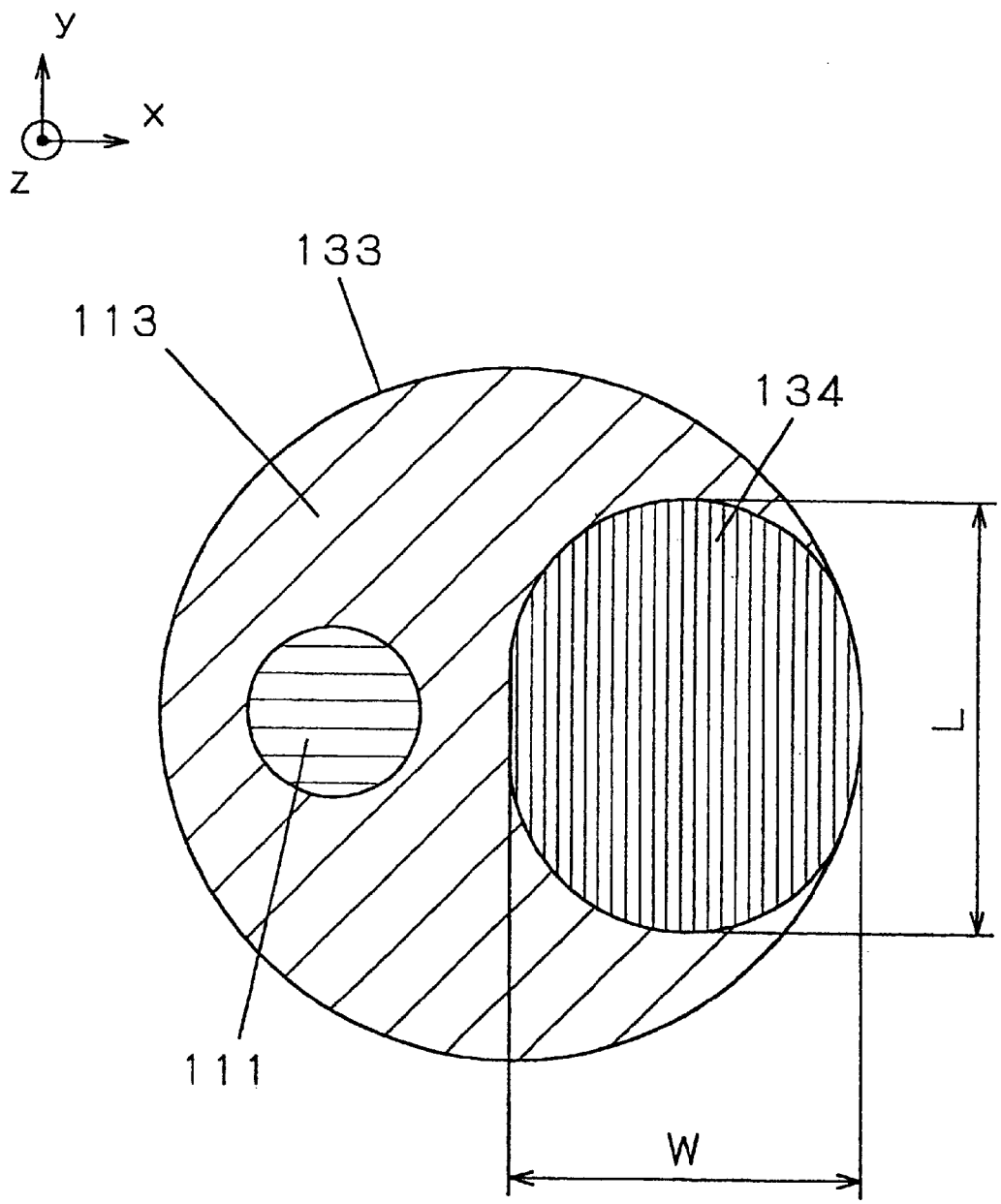
FIG. 10 is a front view of the aperture-provided lens of embodiment 3 of the present invention.

FIG. 10 shows a front view of the aperture-provided lens 133 of the embodiment 3 of the present invention viewed from the optical axis direction.

Because the optical arrangement is the same as that of the embodiment 1, its description is omitted. However, a difference from the embodiment 1 is the shape of a second opening 134 for generating detection light. When assuming that the tangential direction of a guide groove of a disk is equal to y-axis direction, a straight line connecting three beams generated by the diffraction device of the first opening 111 forms a predetermined angle with the guide groove. However, because the angle is small, the straight line is almost parallel with y-axis. When assuming the length of the second opening 134 in y-axis direction as L and the length of it in x-axis direction as W, it is characterized that L is larger than W.

Three beams generated by the diffraction device of the first opening 111 are, as shown in FIG. 3, applied to positions separate from each other by a predetermined distance D1 in y direction on a disk.

Figure 11:
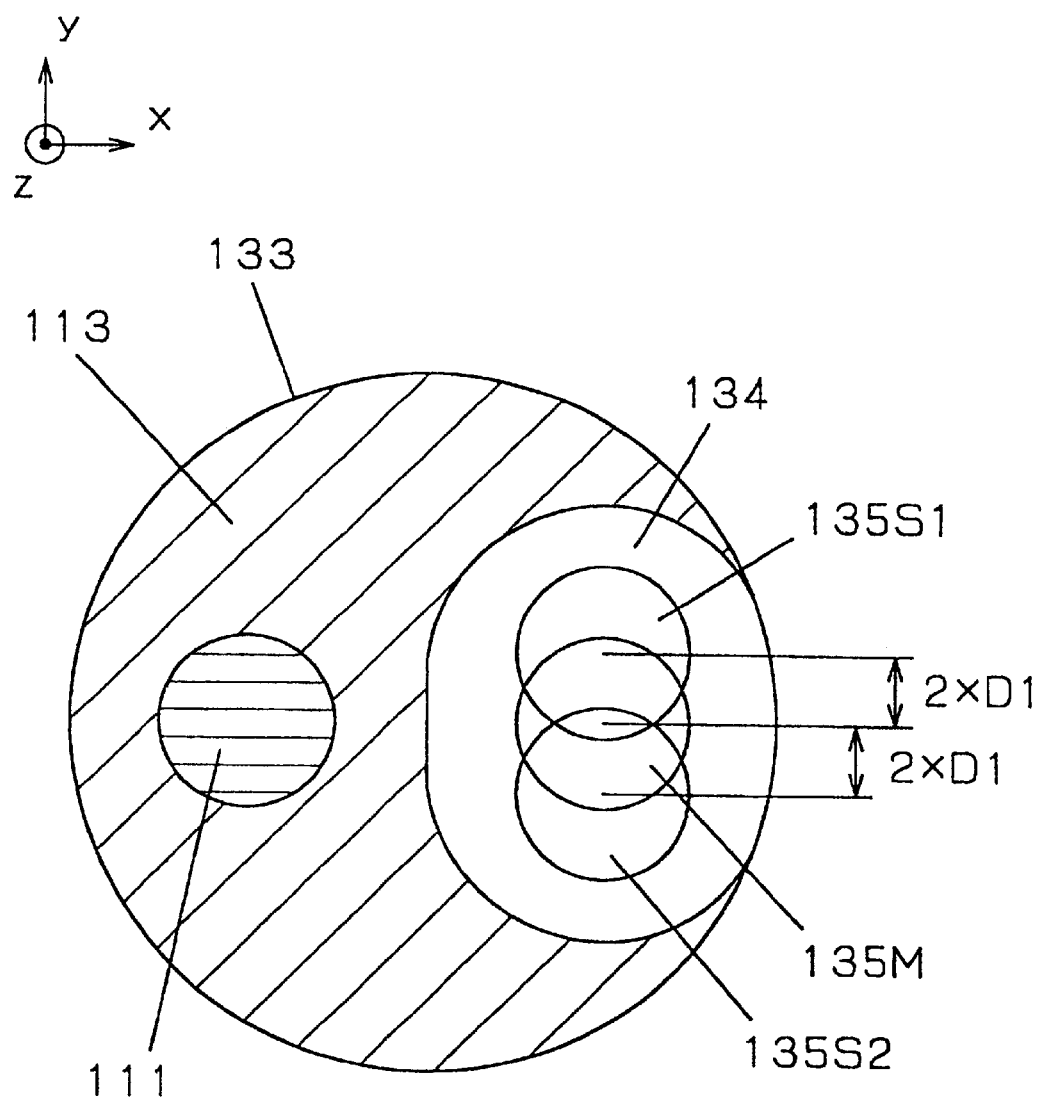
FIG. 11 is a schematic view showing the relations between the second opening of the aperture-provided lens of the embodiment 3 of the present invention and beam positions.

FIG. 11 shows the relation between these returning light beams reflected by the disk on the aperture-provided lens 133.

Three beams become three beams 135S1, 135M, and 135S2 separate from each other by a distance of 2×D1 in the second opening 134. They are almost arranged in y-axis direction. By making the length L of the second opening 134 in y-axis direction larger than the length W of-the opening 134 in x-axis direction, it is possible to almost equally secure the margin for movement of a beam due to a tilt in y-axis direction independently of a beam.

For example, when assuming the interval D1 between beams on a disk as 100 µm, centers of the main beam and sub-beams are separate from each other 200 µm by 200 µm on the second opening 134 and the beam centers of 135S1 and 135S2 are separate from each other by 400 µm. Therefore, by making L larger than W by 400 µm or more, it is possible to secure the same margin in x direction and y direction.

When the distance between the aperture-provided lens 133 and the disk is small, the radius of an opening of the aperture-provided lens 133 decreases and absolute values of L and W necessarily decrease. To detect beams by a detector by separating them, it is impossible to greatly decrease D1. In this case, unless L and W are set so that L is larger than W, a part of either or parts of both of the light beams 135S1 and 135S2 is or are constantly interrupted. Therefore, the structure of this embodiment is particularly advantageous when the distance between the aperture-provided lens 133 and the disk is small.

This structure can be also applied to the shape of the second opening of the lens with the bottom folded of the embodiment 2 and the same advantage as that of this embodiment can be obtained.

[Embodiment 4]

Then, the aperture-provided lens of an embodiment of the present invention is described below by referring to FIG. 12.

Figure 12:
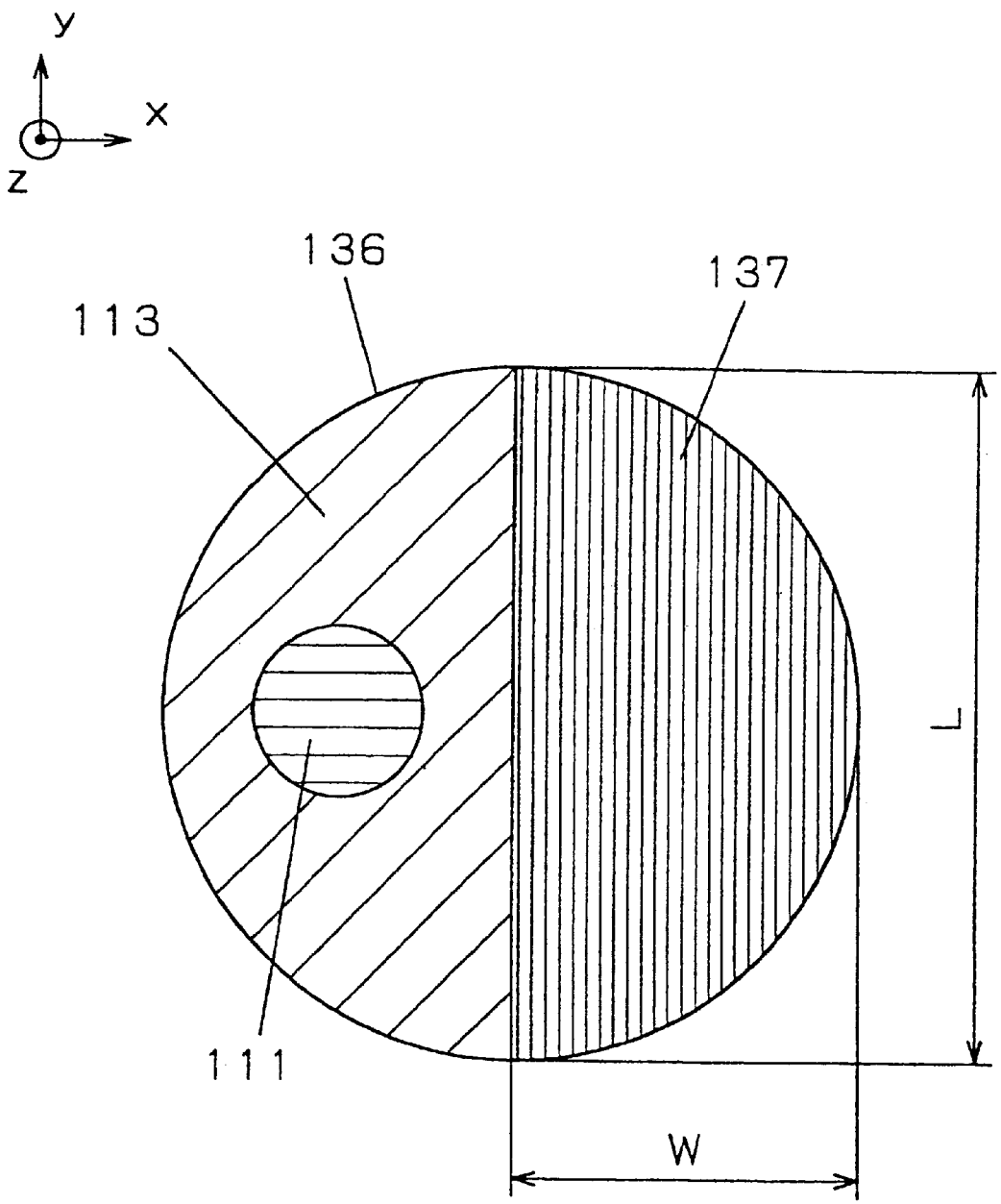
FIG. 12 is a front view of the aperture-provided lens of embodiment 4 of the present invention.

FIG. 12 shows another structure of an aperture-provided lens for obtaining the same advantage as that of the embodiment 3.

The semi-circular portion of an aperture-provided lens 136 serves as a second opening 137. A diffraction device is constituted in the second opening 137 and the light detected here is led to a photodetector. When assuming that the tangential direction of a guide groove is parallel with y-axis direction, the length of the second opening 137 in y-axis direction is L, and the length of the opening 137 in x-axis direction is W, the relation of L=2×W is obtained in the case of this structure.

Because the second opening 137 is asymmetric to x-axis direction, the margin to the tilt of a disk differs in x-axis direction and y-axis direction. However, because the probability in which a part of a light beam is interrupted lowers compared to the case of the embodiment 3, the entire margin increases.

Moreover, by combining the lens with folded bottom of the embodiment 2 with this embodiment, advantages are obtained that the manufacturing process is simplified and the cost is decreased because it is unnecessary to provide an opaque portion for the folded portion.

[Embodiment 5]

Then, the aperture-provided lens of an embodiment of the present invention is described below by referring to FIGS. 13 and 14.

Figure 13:
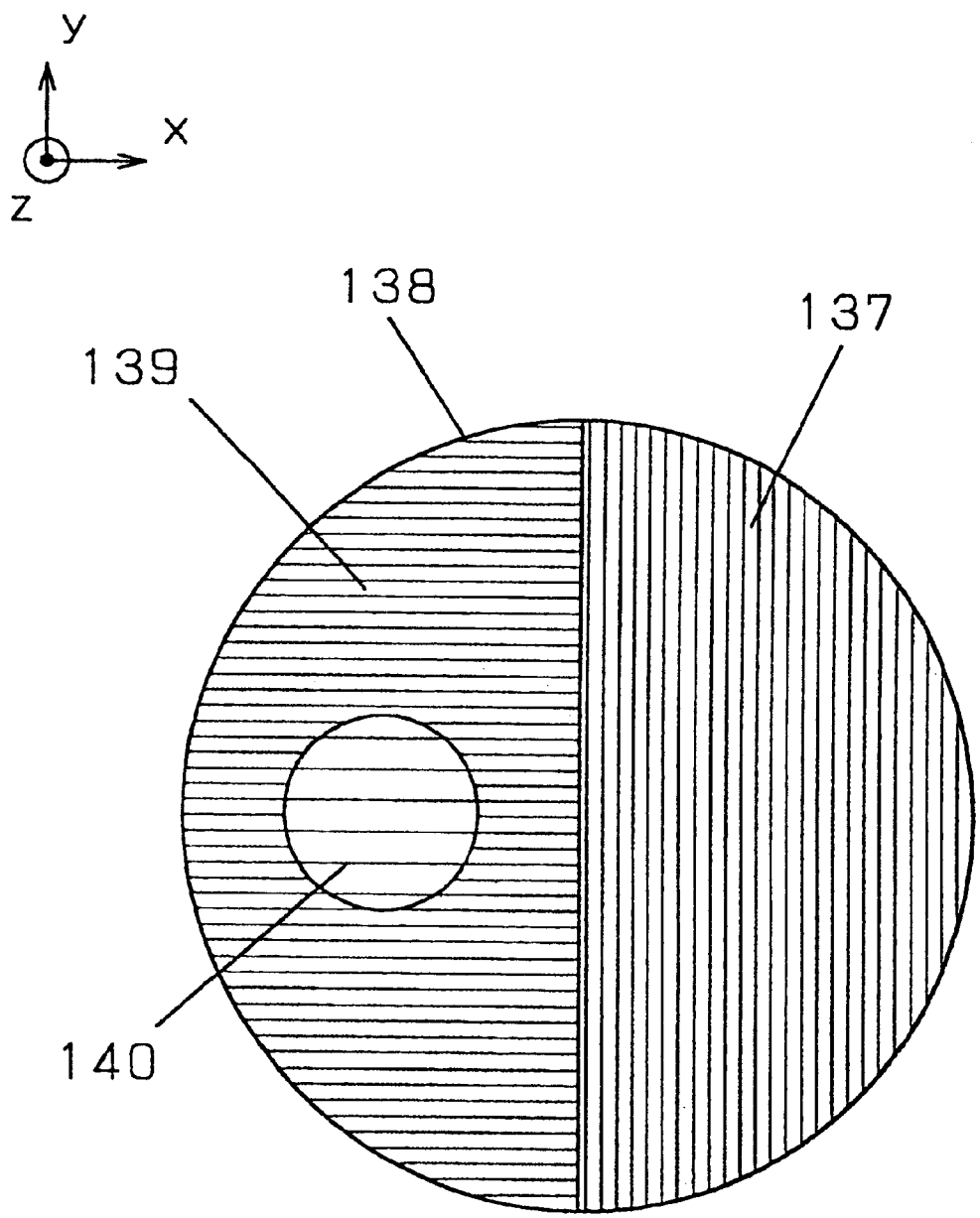
FIG. 13 is a front view of the aperture-provided lenses of embodiments 5 and 6 of the present invention.

FIG. 13 shows a front view of the aperture-provided lens 138 of the embodiment 5 viewed from the optical-axis direction.

A diffraction device corresponding to an opening restriction device of the present invention is formed on an opaque portion 139 excluding a first opening 140 and a second opening 137 to diffract the light entering this portion so that the light does not enter a photodetector. That is, the diffraction device is formed so that the diffraction efficiency of zero-order diffracted-light of the opaque portion 139 becomes 0 and the diffraction efficiencies of positive and negative first-order diffracted-light rays are maximized. Thereby, it is possible to interrupt most of the light passing through the opaque portion 139.

In the case of the above structure, it is possible to form the diffraction device of the opaque portion 139 and the diffraction devices of the first and second openings at the same time. Therefore, it is possible to simplify the manufacture of an aperture-provided lens.

However, the zero-order light left without being diffracted by the diffraction devices of the opaque portion 139 and the second opening 137 is condensed at the same point as the zero-order light (main beam) of the light emitted from the first opening 140. Because the areas of the opaque portion 139 and second opening 137 are larger than the area of the first opening 140, the zero-order light emitted from the opaque portion 139 or the like influences the diameter of the condensed main beam of the first opening 140 unless the percentage of the zero-order light can be controlled. That is, the diameter of the condensed main beam becomes smaller than the diameter of the condensed light beam (sub-beam) generated from positive and negative first-order diffracted-light rays. Under the above state, the waveform of a signal obtained from the main beam is distorted when a position detector crosses a track, and the position detection accuracy is deteriorated.

To prevent the above problem, it is necessary to generate a position detection signal from only the sub-beam of the first opening 140.

Figure 14:
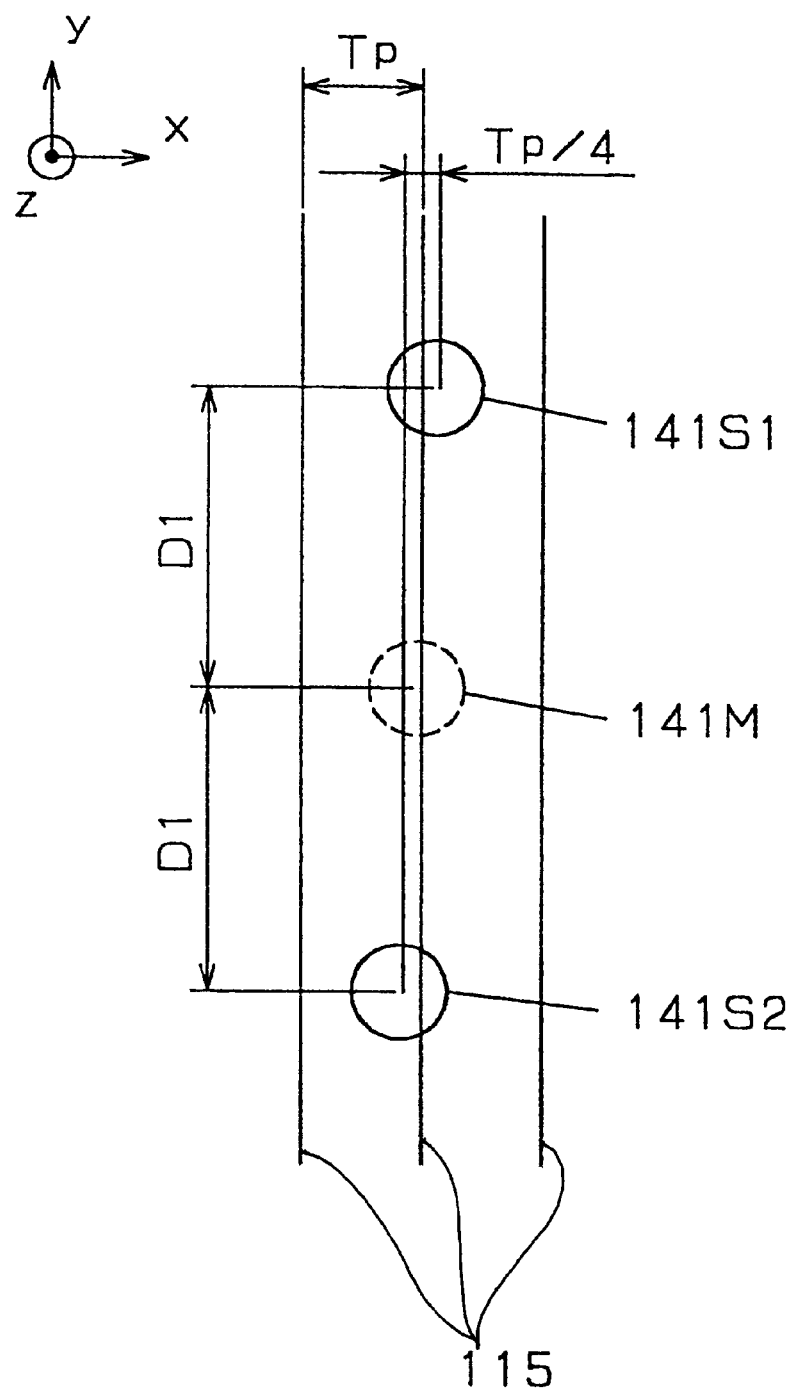
FIG. 14 is a schematic view showing the arrangement of beams on the disk of the embodiment 5 of the present invention.

FIG. 14 shows the arrangement between the guide grooves 115 and condensed beams on a disk. However, though 141M is a position where a main beam is condensed, it is shown by a broken line because the luminous energy of the light condensed here is small. Therefore, the luminous energy is distributed to sub-beams 141S1 and 141S2.

A spot string is arranged slightly diagonally to guide grooves so that the distance between 141S1 and 141S2 in the direction perpendicular to a track becomes ¼ of the interval Tp between the guide grooves. According to the above arrangement, when the position detector moves across a track, the phase of a signal obtained from 141S1 is different from the phase of a signal obtained from 141S2 by 90°. By mixing these two signals with different phases at a proper ratio, it is possible to generate a position detection signal zero-crossing a track at any phase.

In this case, the diffraction efficiency of the zero-order diffracted-light ray of the first opening 140 becomes 0 and thus, it is possible to reduce the loss of light which can be used by maximizing the diffraction efficiencies of positive and negative first-order diffracted-light rays. Moreover, the grating depth of a diffraction device can be set to a value equal to those of the opaque portion 139 and the second opening 137. Therefore, it is possible to form an aperture-provided lens through one-time etching process and provide an inexpensive aperture-provided lens.

Furthermore, because, even if light slightly leaks to zero-order diffracted-light, it does not influence a signal, it is possible to reduce the accuracy such as the grating depth of a diffraction device and easily manufacture the diffraction device.

Furthermore, to generate a position detection signal in accordance with a sub-beam, it is preferable to use a light beam for measuring reflectance in order to avoid the influence due to the change of reflectances of a disk. This light beam can be generated by forming a plurality of openings on an aperture-provided lens as first openings and generating a light beam for detecting a position to a guide groove and a light beam for measuring the reflectance of a disk.

[Embodiment 6]

Then, the aperture-provided lens of another embodiment of the present invention is described below by referring to FIG. 13.

Even when using the aperture-provided lens 138 shown in FIG. 13, it is possible to use three beams of zero-order light ray (main beam) and positive and negative first-order light rays (sub-beams) by adequately decreasing the luminous energy of zero-order light remaining without being diffracted by the diffraction device of the opaque portion 139 or second opening 137 and moreover, it is possible to use the spot arrangement same as the case of the embodiment 1.

When setting the numerical aperture NA of the lens 138 to 0.16 and the numerical aperture NA1 of the first opening 140 to 0.04, the spot diameter of the main beam can be determined by the size of the first opening 140 by setting the percentage of the zero-order light generated by a diffraction device in a region other than the first opening 140 to 5% of incident luminous energy or less.

By completely controlling the shape of a diffraction device and thereby preventing zero-order light from being generated, it is possible to use an aperture-provided lens of the present invention while keeping the circuit structure same as a conventional one.

[Embodiment 7]

Then, the aperture-provided lens of still another embodiment of the present invention is described below by referring to FIG. 15.

Figure 15:
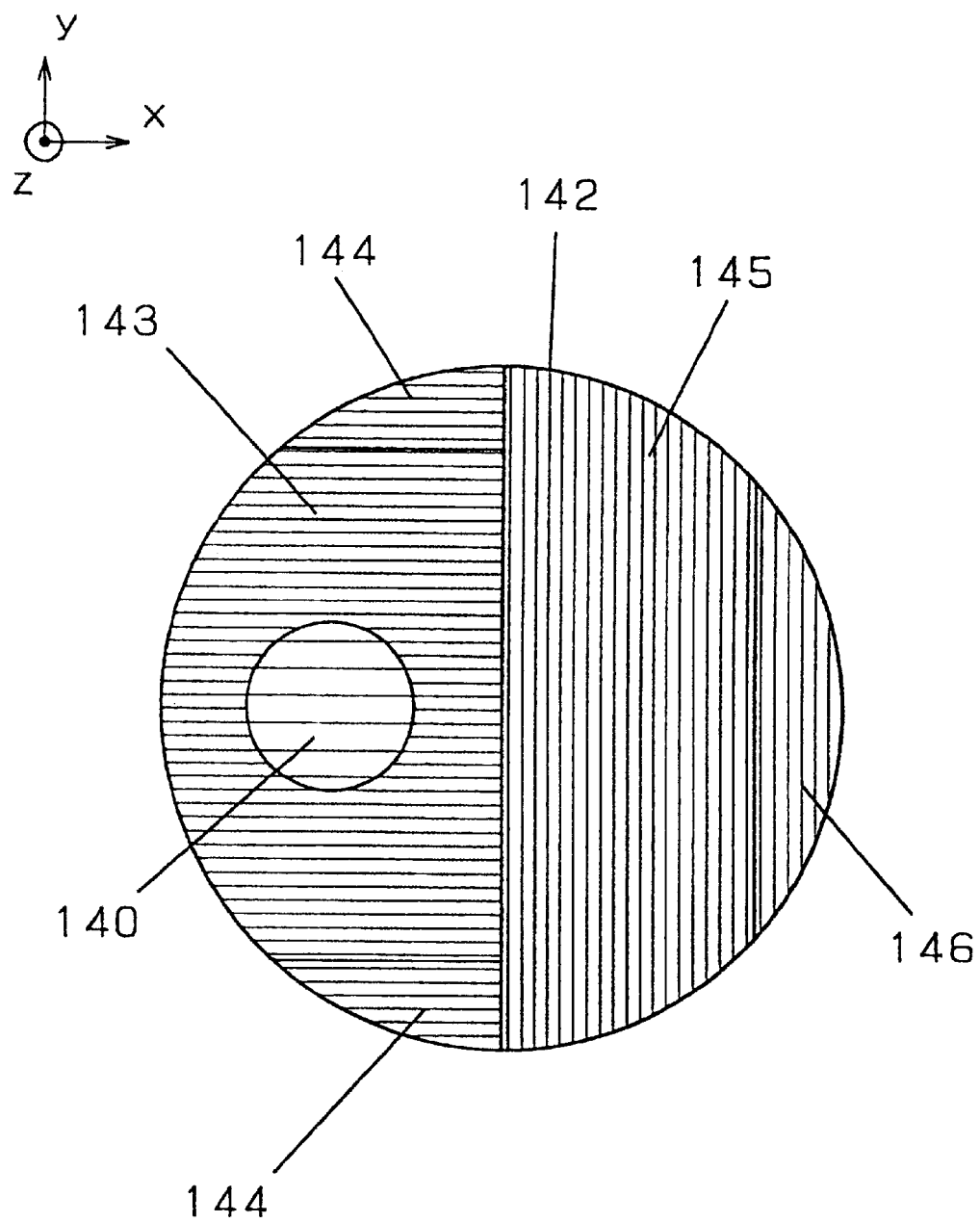
FIG. 15 is a front view of the aperture-provided lens of embodiment 7 of the present invention.

FIG. 15 shows a front view of the aperture-provided lens 142 of the embodiment 7 viewed from the optical axis direction. In the case of this embodiment, an opaque portions 143 and 144 and second openings 145 and 146 are constituted by changing grating intervals of a diffraction device every region and changing diffraction angles.

When the interval between the opaque portions 143 and 144 and the interval between the diffraction devices 145 and 146 on the entire surface of the second opening are equal and the positive first-order diffracted-light beam diffracted in an advancing path is reflected by a disk and enters a diffraction device in the same region, a part of the positive first-order diffracted-light beam diffracted again and converted into a negative first-order diffracted-light beam returns to a semiconductor laser. Moreover, when the negative first-order diffracted-light beam diffracted in the advancing path is reflected by the disk and then diffracted by the same diffraction device, the positive first-order diffracted-light beam also returns to the semiconductor laser. When the distance from the semiconductor laser to the semiconductor laser via the disk is small, the semiconductor laser unstably operates, noises occur, and the accuracy of a position detection signal deteriorates if the luminous energy of the light returned to the semiconductor laser is large.

To avoid the above troubles, the luminous energy of the light to be returned to the semiconductor laser is reduced by changing the grating intervals between some diffraction devices. The grating interval of a diffraction device is determined by considering the position to which the light reflected by the disk in accordance with the distance from the aperture-provided lens 142 to the disk, the grating interval of a diffraction device, and wavelength of a light source.

For example, the wavelength of the light source is set to 800 nm, the grating intervals of some diffraction devices of the second opening 145 are set to 8 µm, and the distance between a lens and a disk is set to 6 mm. The light diffracted by some diffraction devices of the second opening 145 is condensed to a point 600 µm separate from zero-order light on the disk. The light is reflected by the disk and becomes a beam whose center is present at a position 1200 µm shifted from the center of the aperture-provided lens 142 in a shape point-symmetric to the original shape on the aperture-provided lens 142.

When setting the numerical aperture of the aperture-provided lens 142 to 0.16, the radius of the aperture-provided lens 142 becomes 960 µm. Therefore, the first-order light beam in an advancing path enters the second opening again at the maximum width of 720 µm. Therefore, it is possible to set a region 146 outside of a straight line parallel with y-axis at a position 360 µm separate from the end of the second opening and set the grating interval of the diffraction device in the region 146 to 8.2 µm larger than 8 µm. In this case, the light passing through a region having a grating interval of 8 µm in its advancing path passes through a region having a grating interval of 8.2 µm in its returning path and the light passing through a region having a grating interval of 8.2 µm in its advancing path passes through a region having a grating interval of 8 µm in its returning path. Also in the case of the opaque portions 143 and 144, it is possible to determine the range of a region and the grating interval of a diffraction device in the same manner as the above. Thereby, it is possible to reduce the luminous energy of the light to be returned to a semiconductor laser because light passes through diffraction devices having grating intervals different from each other in its advancing path and returning path.

By using this embodiment, it is possible to obtain a stable position detection signal because the luminous energy of the light to be returned to a semiconductor laser and noises do not easily occur even if the distance from the semiconductor laser to a disk is decreased due to downsizing.

[Embodiment 8]

Then, a position detector of an embodiment of the present invention is described below by referring to FIGS. 16 and 17.

Figure 16:
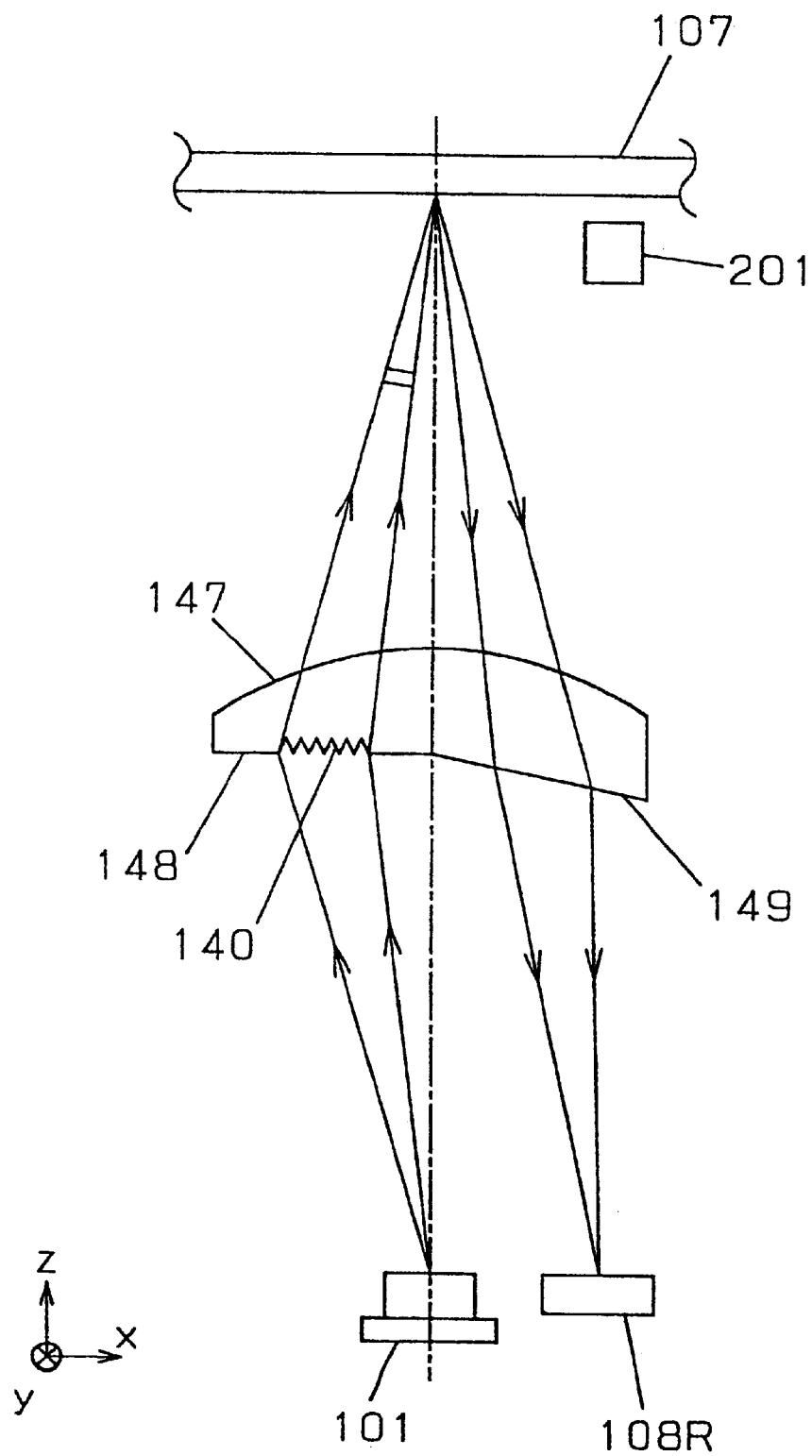
FIG. 16 is a schematic view of an optical system of the position detector of embodiment 8 of the present invention.

FIG. 16 shows a schematic view of the optical system of the position detector of the embodiment 8.

For this embodiment, a case is described in which a second opening is formed on a lens whose bottom is folded in the form of a semicircle, luminous energies of a zero-order light ray and positive and negative first-order diffracted-light rays diffracted from a first opening are set so as to be 1:1:1, and an opaque portion is formed with concaves and convexes of different depths.

The light emitted from a semiconductor laser 101 serving as a light source is bound for an aperture-provided lens 147. A diffraction device is provided for a first opening 140 of the aperture-provided lens 147, in which positive and negative first-order diffracted-light rays (sub-beams) are generated, a diffracted-light beam is focused on a disk, and a beam string is arranged so as to form a predetermined angle to a guide groove. The light beam reflected by the disk passes through a second opening 149 of the aperture-provided lens 147. Because the second opening 149 is formed on the face where the bottom of the aperture-provided lens 147 is folded, the light passing through the face is condensed to a point different from a semiconductor laser 101. By setting a photodetector 108R to the position where the light is condensed, the photodetector 108R outputs a signal corresponding to the received luminous energy and thus, it is possible to generate a position detection signal in accordance with the signal.

Figure 17:
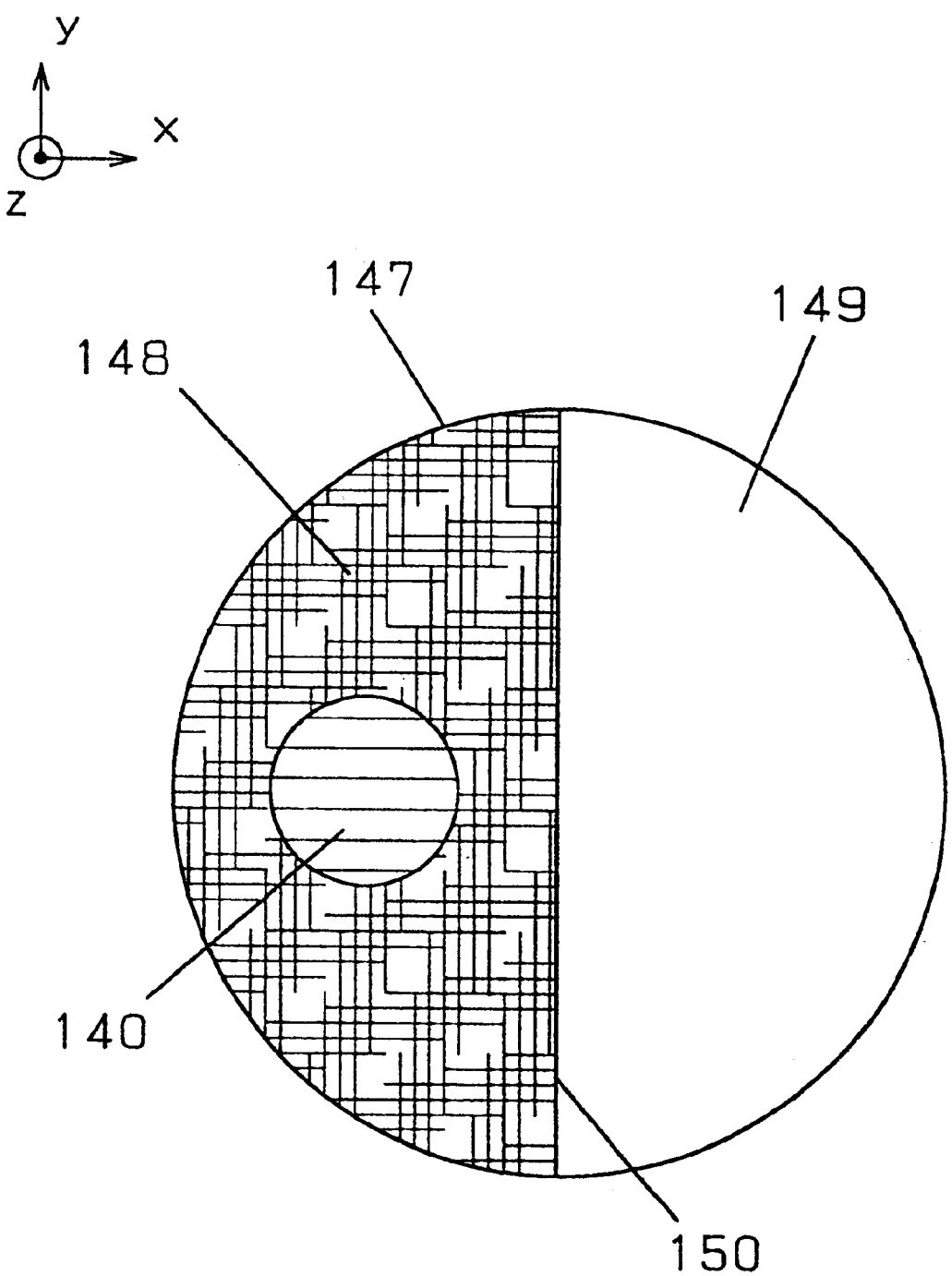
FIG. 17 is a front view of the aperture-provided lens of the embodiment 8 of the present invention.

FIG. 17 shows a front view of the aperture-provided lens 147 viewed from the optical axis direction. A sub-beam is generated by the diffraction device of the first opening 140. Concaves and convexes of different depths are formed in a region 148. The light passing through the region 148 passes through concaves and convexes of different depths to show wave surfaces with random phases. Therefore, the light is not condensed on a disk 107 even after passing through the surface of the aperture provided lens 147 or it does not influence the spot diameter of a zero-order light beam passing through the first opening 140. The bottom of the aperture-provided lens 147 is folded at a boundary 150. The light beam passes through the second opening 149 without being diffracted.

According to the above structure, it is enough to form a diffraction device and an uneven surface only on one face and form a diffraction device with a certain depth so as to equalize the diffraction efficiency of a zero-order light ray with the diffraction efficiencies of positive and negative first-order light rays. Moreover, because light does not theoretically return to a semiconductor laser, the semiconductor laser stably operates even if the distance between the semiconductor laser and a disk is decreased and an accurate less-noise position detection signal can be obtained.

As described above, according to the aperture-provided lens, position detector, and magnetic recorder described for the above embodiment, a part of a light beam returned from a disk is not interrupted even if an information storage medium tilts. Moreover, when a sub-beam tilting from a main beam returns from a disk, a part of the light beam is not interrupted. Therefore, it is possible to stably detect a position and stably record and/or reproduce information.

Though the above embodiment uses one first opening of the present invention, it is also possible to use a plurality of first openings.

Moreover, though the above embodiment uses one second opening of the present invention, it is also possible to use a plurality of second openings.

[Embodiment 9]

Then, the optical system of an embodiment of the present invention is described below by referring to FIG. 18.

Hereafter, an example of the optical system is described in which two diffraction devices are arranged in series to the optical axis as the embodiment 9 of the present invention.

Figure 18:
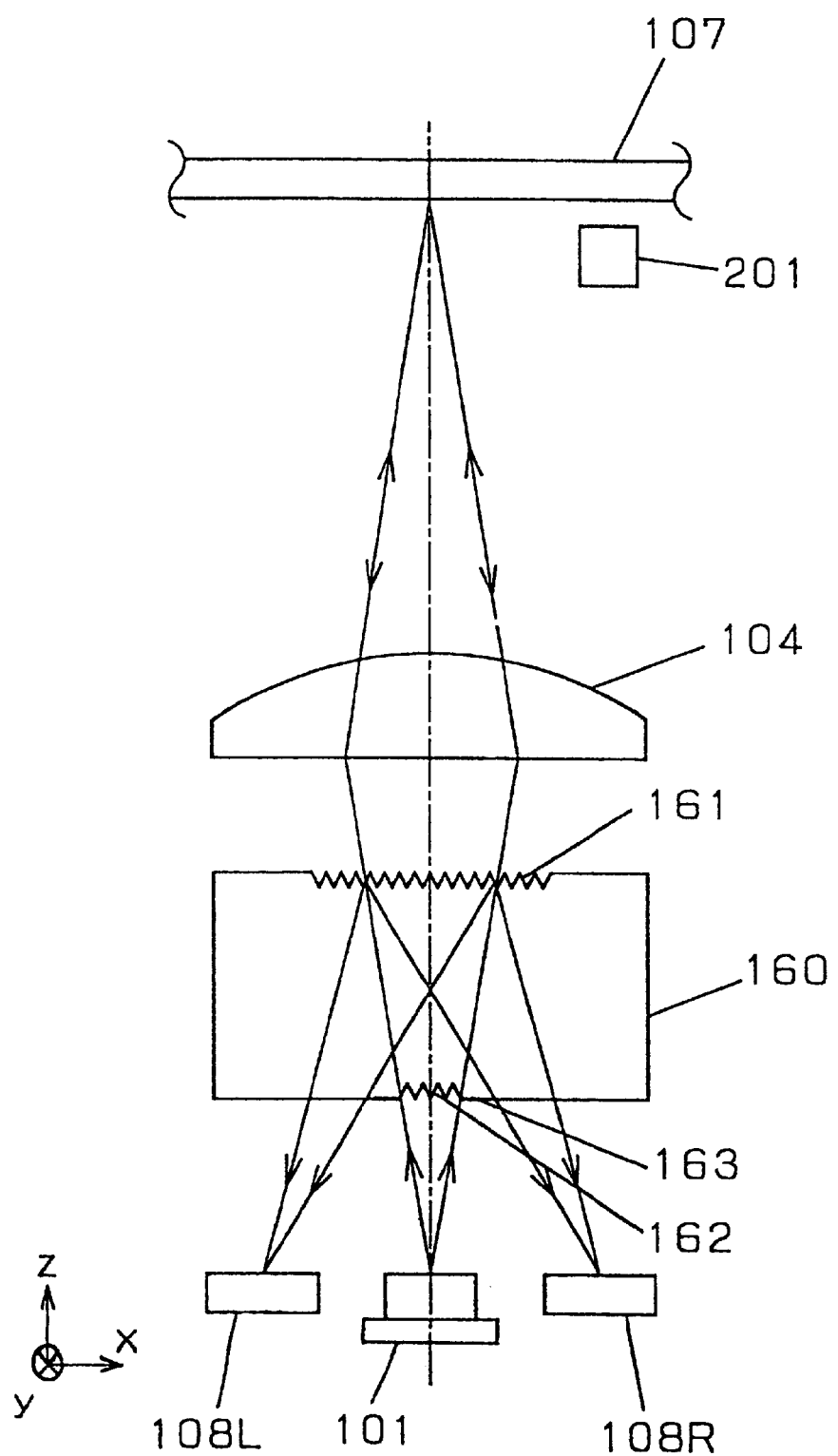
FIG. 18 is a schematic view of the optical system of embodiment 9 of the present invention.

FIG. 18 shows a schematic view of the optical system of the embodiment 9. A sub-beam is generated by a diffraction device close to a light source and diffracted-light for leading light to a detector is generated by a diffraction device far from the light source.

The structure in FIG. 18 is described below. A light beam emitted from a semiconductor laser 101 serving as a light source enters the first plane of a substrate 160. A diffraction device 162 for three beams and an opaque portion 163 surrounding the device 162 are formed on the first plane of the substrate 160. Light is diffracted by the diffraction device 162 for three beams to generate positive and negative first-order light rays. The positive and negative first-order diffracted-light rays are referred to as sub-beams. The opening of light in an advancing path is restricted by the opaque portion 163 corresponding to an opening restriction device of the present invention and NA of the advancing path is determined by the opening diameter and the distance between a lens 104 and a disk 107.

A light beam emitted from the diffraction device 162 for three beams passes through a diffraction device 161 for detection provided for the second plane of the substrate 160. Though diffracted-light is produced even in an advancing path by the diffraction device 161 for detection, design is made so that the diffracted-light in the advancing path does not contribute to signal detection. The light beam passing through the diffraction device 161 for detection is condensed onto the disk 107 by the lens 104. The light beam reflected on the disk 107 passes through the lens 104 again and enters the diffraction device 161 for detection on the second plane of the substrate 160. The positive and negative diffracted-light beams diffracted by the diffraction device 161 for detection pass through positions separate from the opaque portion 163 on the first plane of the substrate 160 and the diffraction device 162 for three beams and enter photodetectors 108R and 108L. The photodetectors 108R and 108L respectively output a signal corresponding to the luminous energy of received light.

The opening of the advancing path is restricted by the diffraction device 162 for three beams and the opaque portion 163. In the case of a returning path, however, the diffraction device 161 for detection is formed in a portion larger than a region to be actually hit by light. Therefore, even if a disk tilts or a sub-beam falls, a part of a light beam returned from the disk is not interrupted and therefore, a stable position detection signal is obtained.

By using this embodiment, it is possible to decrease the numerical aperture of the optical system compared to a structure diagonally irradiated when taking the same margin because advancing and returning optical paths are partially overlapped. Therefore, the advantages are obtained that the aberration of a lens can be decreased and the size of a gap for passing light can be decreased.

[Embodiment 10]

Then, the position detector of an embodiment of the present invention is described below by referring to FIG. 19.

Figure 19:
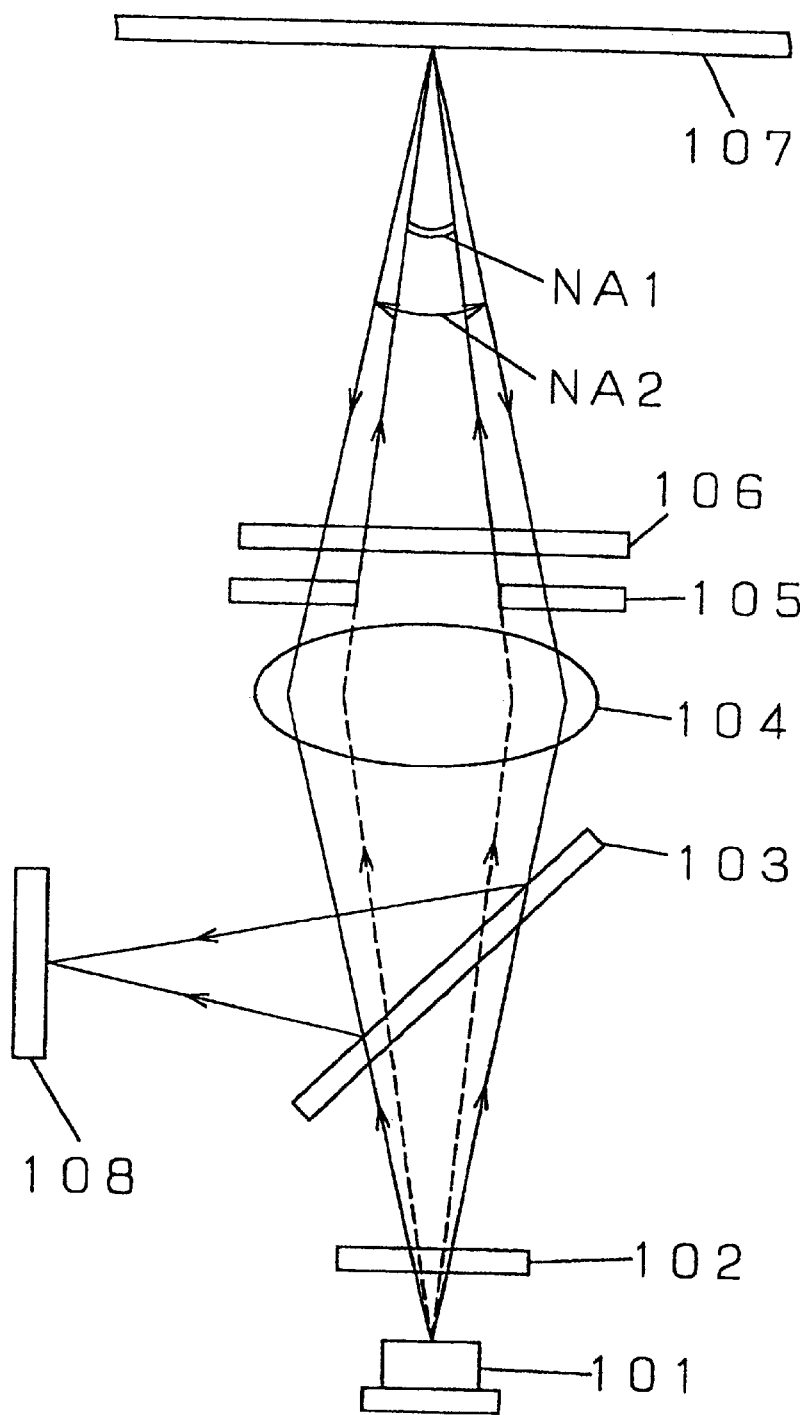
FIG. 19 is a schematic view of an optical system of the position detector of embodiment 10 of the present invention.

In FIG. 19, the linearly polarized light emitted from a semiconductor laser 101 serving as a light source produces a zero-order light ray and positive and negative first-order diffracted-light rays (these are not illustrated) by a diffraction grating 102. The above zero-order light ray is referred to as a main beam and the above positive and negative first-order diffracted-light rays are referred to as sub-beams. Moreover, it is assumed that the light emitted from the semiconductor laser 101 is polarized in parallel with the paper surface of FIG. 19.

The main beam and two sub-beams pass through a half mirror 103 and are condensed by a lens 104 serving as a condensing optical system. The openings of the main beam and two sub-beams condensed by the lens 104 are restricted by a polarization anisotropic aperture 105 so that the openings have a desired numerical aperture NA1. The main and sub-beams are converted into circularly polarized light by a quarter-wavelength plate 106 and condensed by a disk 107 serving as an information storage medium. A beam string comprising the main beam and two sub-beams is arranged on the disk 107 so as to form a predetermined angle to a track.

The light reflected by the disk 107 passes through the quarter-wavelength plate 106 again and becomes linearly polarized light polarized in the direction vertical to the paper surface, that is, the direction perpendicular to an advancing path. The returning-path light having polarization vertical to the paper surface passes through a lens 104 without being restricted in opening by the polarization anisotropic aperture 105 and it is reflected by the half mirror 103 and enters a photodetector 108. That is, in the returning path, the light having a numerical aperture of NA2 or less determined by the diameter of the lens 104 enters the photodetector 108.

The photodetector 108 is constituted with a plurality of detection regions, which separately receives three rays of a main beam and two sub-beams and outputs a signal corresponding to the luminous energy of received light. Three rays when entering the disk 107 become three spots on the disk 107 and irradiate different positions in the direction perpendicular to a track. Therefore, modulation factors of signals obtained from three detection regions are-different from each other. By computing these signals, it is possible to detect the relative positional relation between a track and a beam irradiating position.

In the case of the conventional example, when setting NA to 0.04 as described above, approx. half of light is eclipsed in a returning path if the optical axis is tilted by 1.1° due to the tilt of a disk and the quality of a signal used for detecting a position is deteriorated.

However, by using a position detector of the present invention and setting NA1 to 0.04 and NA2 to 0.08, eclipse hardly occurs in a returning path up to a tilt of 1.1° even if the optical axis is tilted due to the tilt of a disk or the quality of a signal is not deteriorated. When the tilt of the optical axis reaches 2.2° in the case of the structure of a position detector of the present invention, deterioration of a signal almost equal to 1.1° in the case of the conventional example occurs. That is, an apparatus of the present invention makes it possible to double the tolerance of a tilt of the optical axis compared to the case of the conventional structure.

Therefore, when using a position detector of the present invention, eclipse does not occur even if the light reflected due to the tilt of a disk returns to a position different from an advancing path. Therefore, the quality of a position detection signal is not easily deteriorated.

Moreover, in the case of the above-described method of using a main beam and two sub-beams for a position detector of the present invention, when the optical axis is not tilted due to the tilt of a disk, sub-beams (positive and negative first-order diffracted-light rays) enter diagonally to a main beam, no eclipse occurs in the advancing path and returning path passing through the polarization anisotropic aperture 105 and quarter-wavelength plate 106, and the numerical aperture NA1 of the advancing path is equal to the numerical aperture NA2 of the returning path. In the case of the conventional example, however, eclipse occurs by a value equivalent to the difference obtained by subtracting NA1 from NA2 compared to an apparatus of the present invention.

When decreasing the distance between a lens and a disk in order to downsize the apparatus, the angle particularly increases. Also in this case, it is possible to eliminate eclipse from the returning path of a sub-beam and obtain a stable position detection signal by using a position detector of the present invention.

A polarization anisotropic aperture can be realized by forming a hole having an opening diameter necessary for an advancing path on an analyzer (linear polarizing plate).

Moreover, there is a method for realizing an optical system making the numerical aperture of a returning path larger than that of an advancing path by using a polarized-beam splitter instead of a half mirror.

[Embodiment 11]

Figure 20:
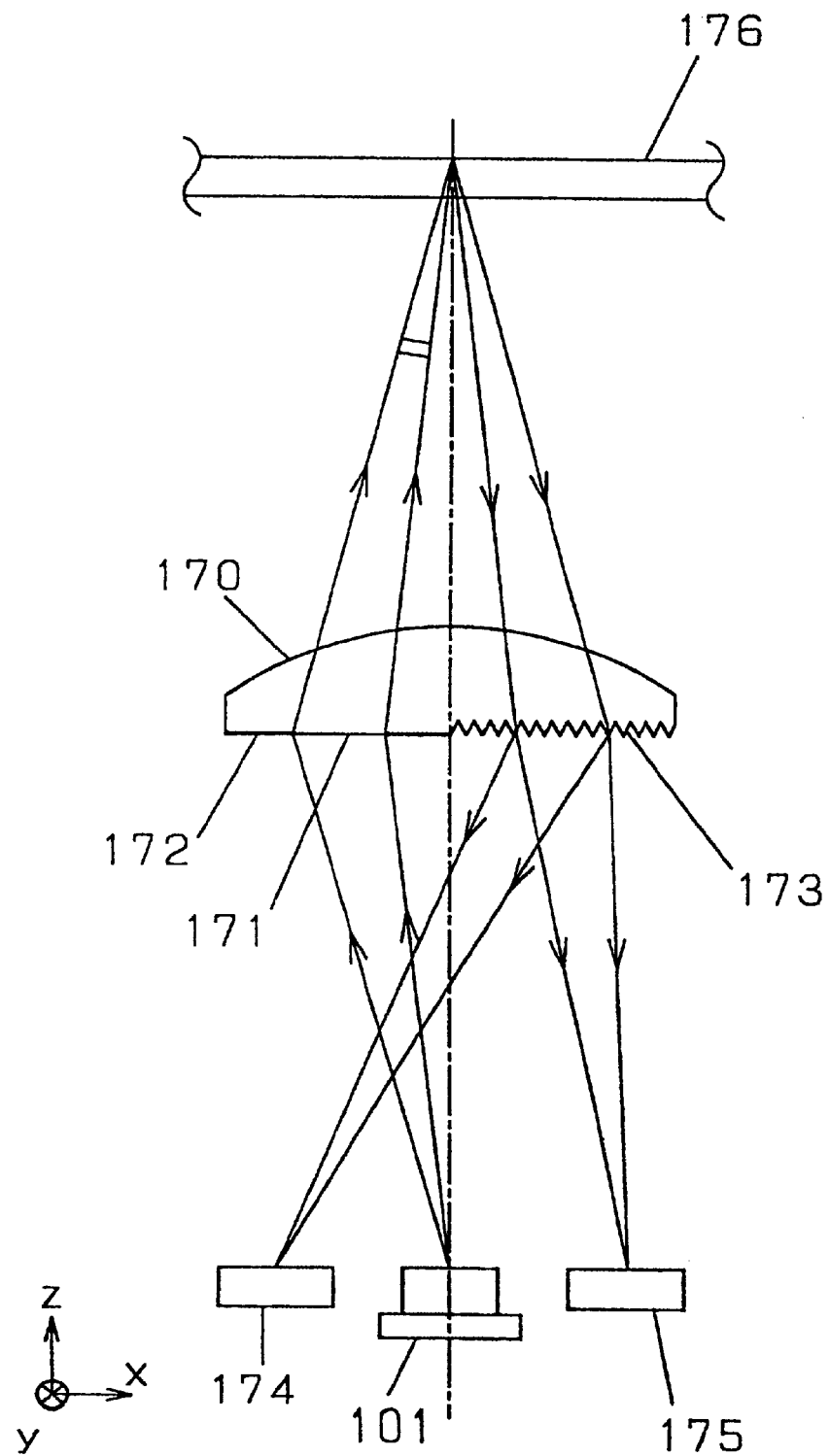
FIG. 20 is a schematic view of an optical system of the tilt detector of embodiment 11 of the present invention.

Then, a tilt detector using an aperture-provided lens is described below as the embodiment 11 of the present invention. FIG. 20 shows a schematic view of the optical system of the tilt detector of this embodiment.

As shown in FIG. 20, the light beam emitted from a semiconductor laser 101 serving as a light source passes through a first opening 171 of an aperture-provided lens 170 and is reflected by the reflection plane of a disk 176. The reflected light enters a second opening 173 of the aperture-provided lens 170 to produce diffracted-light rays by a diffraction device provided for the second opening 173. The positive and negative diffracted-light rays produced by the diffraction device of the second opening 173 is received by a photodetectors 174 and 175.

Figure 21:
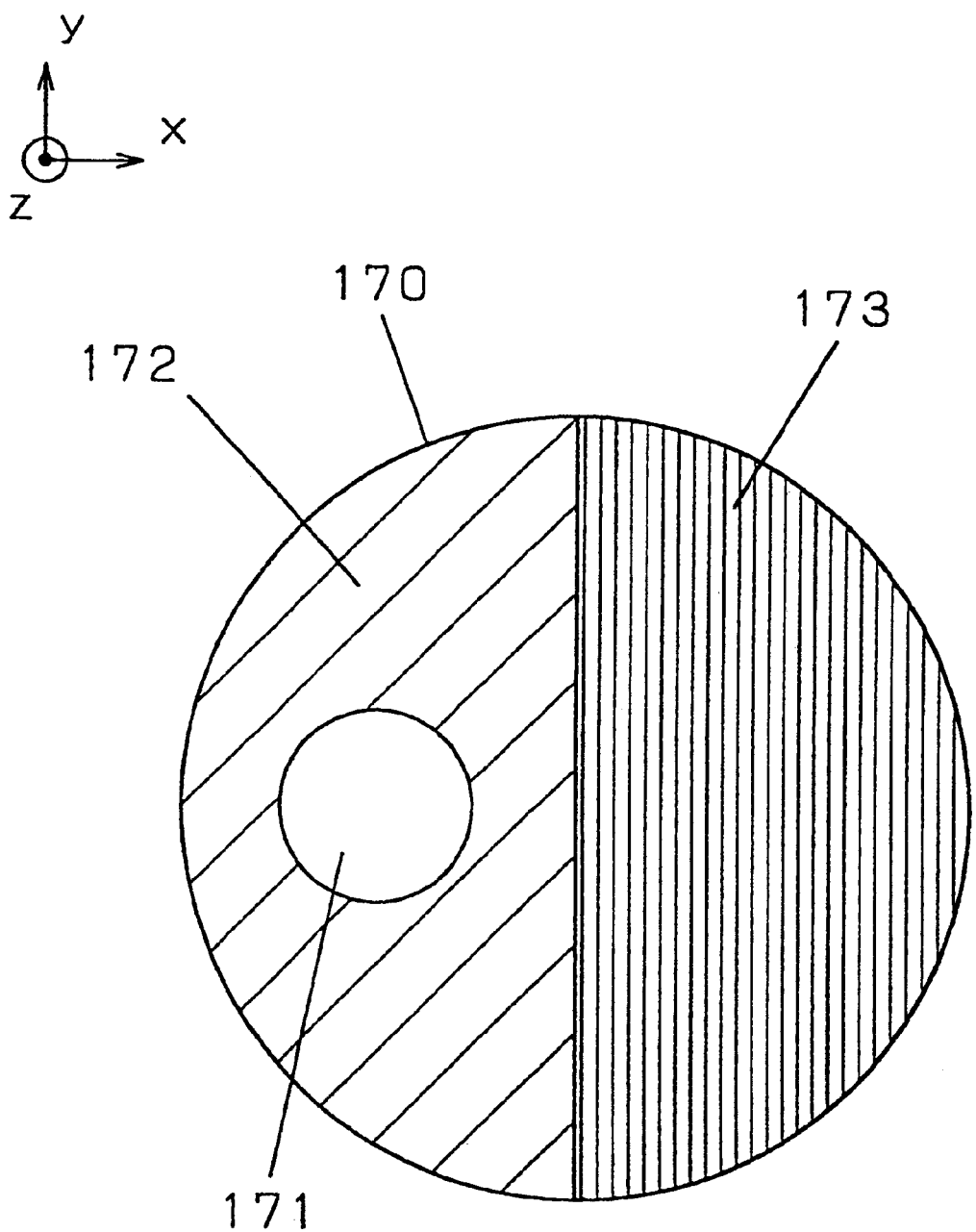
FIG. 21 is a front view of the aperture-provided lens of the embodiment 11 of the present invention.

FIG. 21 shows an illustration of the aperture-provided lens 170 viewed from the optical axis direction.

Light passes through the first opening 171 but it does not penetrate an opaque portion 172. In this case, a specific direction for detecting a tilt is assumed as x-direction. A diffraction device 173 is provided with a diffraction device in which a grating interval simply increases or decreases depending on the position of x. Thereby, angles of light to be diffracted are changed depending on a position where a light beam hits a diffraction device 173.

Figure 22:
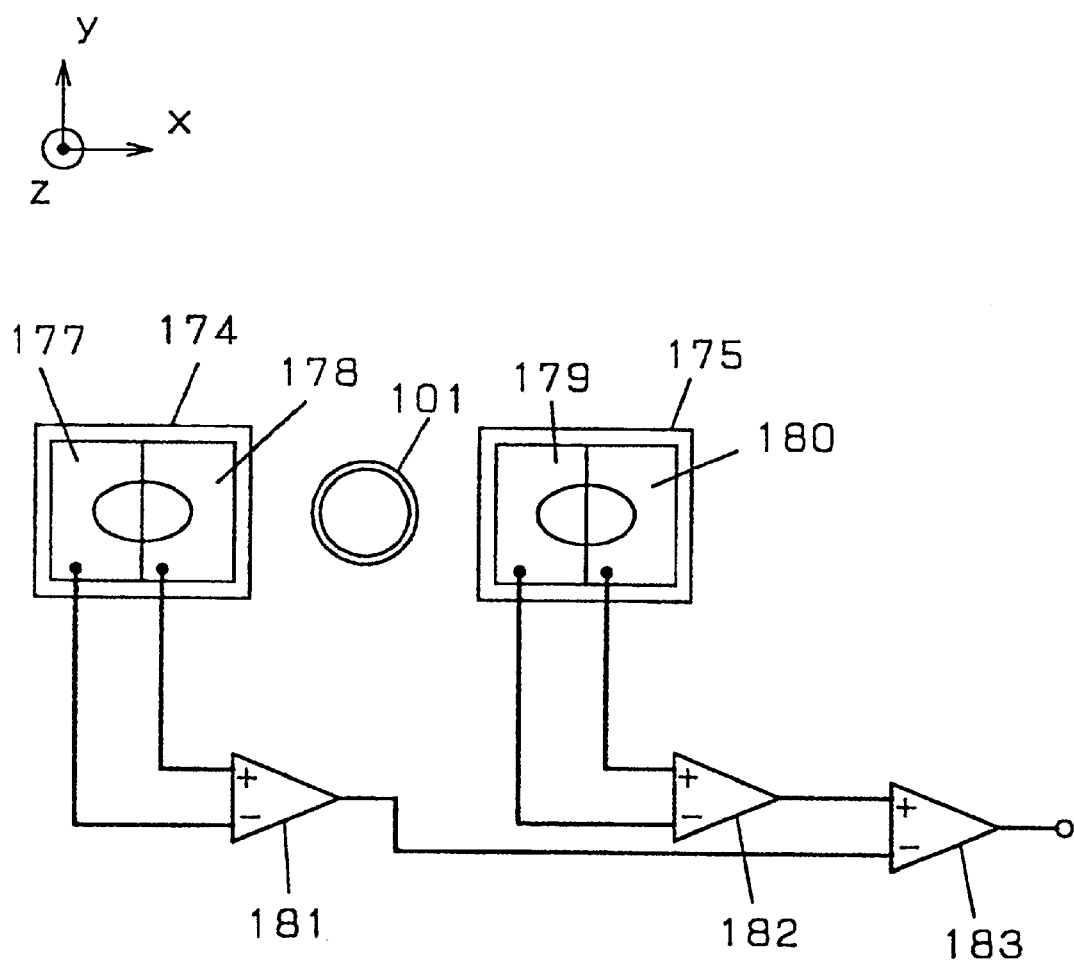
FIG. 22 is the arrangement of beams on the photodetector of the embodiment 11 of the present invention and a block diagram of the circuit system of the photodetector.

FIG. 22 shows the arrangement of a light source and a photodetector and the outline of the relation between a detection region and an arithmetic circuit.

The photodetectors 174 and 175 are symmetrically arranged at the both sides of the light source 101. The photodetector 174 has two detection regions 177 and 178 and the photodetector 175 has two detection regions 179 and 180. The detection regions are parted by a parting line in the direction vertical to the direction in which light is diffracted by the second opening. In this case, a parting line parallel with y-axis is used. A differential circuit 181 receives a signal output in accordance with the luminous energy of the light received from the detection region 177 or 178 and outputs the differential signal of the received signal. Moreover, a differential circuit 182 receives a signal output in accordance with the luminous energy of the light received from the detection region 179 or 180 and outputs the differential signal of the received signal. A differential circuit 183 receives a signal output from the differential circuit 181 or 182 and outputs the differential signal of the received signal.

When the disk 176 tilts 90 degrees about y-axis with respect to the optical system, the light reflected on the disk 176 irradiates different positions of the second opening 173 in accordance with the tilt of the disk 176. Grating intervals of a diffraction device provided for the second opening 173 are changed in accordance with an x-directional position. Therefore, diffraction angles of the diffracted light produced by the diffraction device of the second opening 173 are changed in accordance with the tilt of the disk 176. When diffraction angles are changed, the beam position on the photodetector 174 or 175 moves. Therefore, luminous energies entering detection regions at the both sides of the parting line are changed. By computing signals obtained from these luminous energies with the differential circuits 181 and 182, it is possible to obtain a signal corresponding to the tilt of a disk.

By using the aperture-provided lens 170, it is possible to constitute a tilt detector of a simple structure. Also in the case of this optical system, the diameter of the optical path of a light beam bound for a photodetector from the disk through the second opening is larger than that of the optical path of a light beam bound for the disk from the light source through the first opening. Therefore, a light beam is not interrupted and thereby, it is possible to stably detect a tilt.

A tilt detecting direction is not restricted to x-direction. It is possible to detect a tilt by using any axis on an x-y plane.

What is claimed is:

1. An optical system comprising an advancing optical path in which a light beam converges on a reflective medium and a returning optical path in which a light beam is reflected and/or diffracted by said reflective medium, wherein
   when a width of an optical path through which said advancing optical path passes without being interrupted is referred to as a first width, while a width of an optical path through which said returning optical path passes without being interrupted is referred to as a second width;
   said second width is larger than said first width;
   size of the light beam on said reflective medium depends on the first width and is independent of the second width; and
   a single lens for receiving the advancing optical path and the returning optical path, the single lens having a single curved surface.

2. The optical system according to claim 1, wherein
   an opening restriction device having a predetermined opening to determine said first thickness is included, and
   said opening restriction device restricts the thickness of a light beam passing through an opening by changing optical paths of a light beam entering a region outside of said opening.

3. The optical system according to claim 1 wherein
   an opening restriction device having a predetermined opening to determine said first width is included, and
   said opening restriction device restricts the width of a light beam passing through an opening by controlling transmittance of a light beam entering a region outside of said opening to a predetermined value or less.

4. The optical system according to claim 1, wherein
   an opening restriction device having a predetermined opening to determine said first thickness is included, and
   said opening restriction device restricts the thickness of a light beam passing through an opening by disturbing the phase of a light beam entering a region outside of said opening.

5. A position detector comprising:
   a light source for emitting a light beam;
   condensing means including a lens for converging the light beam emitted from said light source on a reflective medium;
   beam branching means including the lens for branching the light beam reflected and/or diffracted by said reflective medium;
   a photodetector for receiving a light beam branched by said beam branching means and outputting a signal corresponding to luminous energy; and
   an arithmetic circuit for receiving a signal output from said photodetector and outputting a position detection signal; wherein
   when a width of an optical path trough which an advancing optical path for the light beam emitted from said light source to be bound for said reflective medium can pass without being interrupted is referred to as a first width, while a width of an optical path through which a returning path for said light beam to be bound for said photodetector from said reflective medium through said beam branching means can pass without being interrupted is referred to as a second width,
   an optical system is constituted in which said second width is larger than the first width and size of the light beam on said reflective medium depends on the first width and is independent of the second width; and
   the lens being a single lens for receiving the advancing optical path and the returning optical path, the single lens having a single curved surface.

6. A magnetic recorder comprising:
   a light source for emitting a light beam;
   condensing means for converging the light beam emitted from said light source on an information storage medium;
   beam branching means for branching the light beam reflected and/or diffracted by said information storage medium;
   a photodetector for receiving a light beam branched by said beam branching means and outputting a signal corresponding to luminous energy;
   an arithmetic circuit for receiving a signal output from said photodetector and outputting a position detection signal;
   a magnetic head for recording and/or reproducing information into and/or from said information storage medium; and
   transfer means for positioning said magnetic head by receiving said position detection signal; wherein
   when a width of an optical path through which an advancing optical path for the light beam emitted from said light source to be bound for said information storage medium can pass without being interrupted is referred to as a first width, while a width of an optical path through which a returning optical path for said light beam to be bound for said photodetector from said information storage medium through said beam branching means can pass without being interrupted is referred to as a second width, an optical system is constituted in which said second width is larger than said first width and size of the light beam on said information storage medium depends on the first width and is independent of the second width.

7. A position detector comprising:

a light source for emitting a light beam;

a diffraction device for generating a diffracted beam in a travelling direction different from the travelling direction of transmitted light beam by receiving said light beam;

condensing means including a lens for converging said diffracted beam on a reflective medium;

beam branching means including the lens for branching said diffracted beam reflected and/or diffracted by said reflective medium;

a photodetector for receiving said diffracted beam branched by said beam branching means and outputting a signal corresponding to luminous energy; and an arithmetic circuit for receiving a signal output from said photodetector and outputting a position detection signal; wherein when a width of an optical path through which an advancing optical path for the light beam emitted from said light source to be bound for said reflective medium can pass without being interrupted is referred to as a first width, while a width of an optical path through which a returning path for said light beam to be bound for said photodetector from said reflective medium through said beam branching means can pass without being interrupted is referred to as a second width, an optical system is constituted in which said second width is larger than the first width and size of the light beam on said reflective medium depends on the first width and is independent of the second width; and the lens being a single lens for receiving the advancing optical path and the returning optical path, the single lens having a single curved surface.

8. A position detector comprising:

a light source for emitting a light beam;

condensing means including a lens for converging a light beam emitted from said light source on a reflective medium;

beam branching means including the lens for branching a light beam reflected and/or diffracted by said reflective medium;

a photodetector for receiving a light beam branched by said beam branching means and outputting a signal corresponding to luminous energy; and an arithmetic circuit for receiving a signal output from said photodetector and outputting a position detection signal; wherein said condensing means is provided with an aperture having a first opening and a second opening and a diffraction device is provided for at least one of said openings, and when a width of an optical path through which an advancing optical path for the light beam emitted from said light source to be bound for said reflective medium can pass without being interrupted is referred to as a first width, while a width of an optical path through which a returning path for said light beam to be bound for said photodetector from said reflective medium through said beam branching means can pass without being interrupted is referred to as a second width, said first width is defined by said first opening; said second width is larger than said first width; and the size of the light beam on said reflective medium depends on said first width and is independent of the second width; and the lens being a single lens for receiving the advancing optical path and the returning optical path, the single lens having a single curved surface.

9. A magnetic recorder comprising:

a light source for emitting a light beam;

condensing means for converging a light beam emitted from said light source on an information storage medium;

beam branching means for branching a light beam reflected and/or diffracted by said information storage medium;

a photodetector for receiving a light beam branched by said beam branching means and outputting a signal corresponding to luminous energy;

an arithmetic circuit for receiving a signal output from said photodetector and outputting a position detection signal;

a magnetic head for recording and/or reproducing information into and/or from said information storage medium; and transfer means for positioning said magnetic head by receiving said position detection signal; wherein said condensing means is provided with an aperture having a first opening and a second opening and a diffraction device is provided for at least one of said openings, and when a width of an optical path through which an advancing optical path, along which a light beam emitted from said light source proceeds toward said reflective medium, passes without being interrupted is referred to as a first width, while a width of an optical path through which a returning optical path, along which said light beam proceeds toward said photodetector through said beam branching means from said reflective medium, passes without being interrupted is referred to as a second width, said first width is defined by said first opening;

said second width is larger than said first width; and the size of the light beam on said reflective medium depends on said first width and is independent of the second width.

10. A position detector comprising:

a light source for emitting a light beam;

a mirror for reflecting a light beam emitted from said light source;

condensing means including a lens for converging said light beam on a reflective medium;

beam branching means including the lens for branching a light beam reflected and/or diffracted by said reflective medium;

a photodetector for receiving a light beam branched by said beam branching means and outputting a signal corresponding to luminous energy;

an arithmetic circuit for receiving a signal output from said photodetector and outputting a position detection signal; and the lens having an opening restriction device for restricting a width of a light beam proceeding toward said reflective medium from said light source; wherein when a width of an optical path through which an advancing optical path for the light beam emitted from said light source to be bound for said reflective medium can pass without being interrupted is referred to as a fist width, while a width of an optical path rough which a returning path for said light beam to be bound for said photodetector from said reflective medium through said beam branching means can pass without being interrupted is referred to as a second width, said second width is larger than said first width, and the size of the light beam on said reflective medium depends on said first width and is independent of the second width;

the lens being a single lens for receiving the advancing optical path and the returning optical path, the single lens having a single curved surface; and the relative positional relation between said light source and said mirror is determined so that the center of the luminous energy of a light beam emitted from said light source is brought to the center of said opening restriction device.

11. A method for positioning a plurality of light beams on an information storage medium in an optical system having a single lens with a single curved surface positioned in an advancing optical path and a returning optical path, the method comprising the steps of:

(a) forming a first light path in the advancing optical path for converging the plurality of light beams on the information storage medium; and (b) forming a second light path in the returning optical path for branching the plurality of light beams reflected from the information storage medium on a plurality of photodetectors, and (c) forming a first opening in the lens for the first light path and a second opening in the lens for the second light path, wherein the second opening is larger than the first opening and the size of each of the plurality of light beams converging on the information storage medium depends on the first opening and is independent of the second opening.

12. The method of claim 11 in which step (a) includes forming the first light path by a first aperture in the lens and in which step (b) includes forming the second light path by a second aperture in the lens, forming the second aperture wider than the first aperture.

* * * * *

UNITED STATES PATENT AND TRADEMARK OFFICE
CERTIFICATE OF CORRECTION

PATENT NO.    : 6,327,110 B1
DATED         : December 4, 2001
INVENTOR(S)   : Sano et al.

It is certified that error appears in the above-identified patent and that said Letters Patent is hereby corrected as shown below:

<u>Column 23,</u>
Line 7, "fist" should be -- first --.
Line 8, "rough" should be -- through --.

Signed and Sealed this

Third Day of December, 2002

JAMES E. ROGAN
*Director of the United States Patent and Trademark Office*